(12) United States Patent
Yang et al.

(10) Patent No.: US 7,830,041 B2
(45) Date of Patent: Nov. 9, 2010

(54) AUTOMATICALLY STANDBY POWER CUT-OFF PLUG SOCKET

(76) Inventors: Ki Chool Yang, #171-10 Bundang-dong, Bundang-ku, Sungnam-si, Kyunggi-do (KR); Sun Young Kim, #171-10 Bundang-dong, Bundang-ku, Sungnam-si, Kyunggi-do (KR)

( * ) Notice: Subject to any disclaimer, the term of this patent is extended or adjusted under 35 U.S.C. 154(b) by 302 days.

(21) Appl. No.: 12/065,339

(22) PCT Filed: Aug. 31, 2006

(86) PCT No.: PCT/KR2006/003459

§ 371 (c)(1),
(2), (4) Date: Feb. 29, 2008

(87) PCT Pub. No.: WO2007/027063

PCT Pub. Date: Mar. 8, 2007

(65) Prior Publication Data

US 2008/0231121 A1    Sep. 25, 2008

(30) Foreign Application Priority Data

Sep. 2, 2005   (KR) ............... 10-2005-0081857
Aug. 29, 2006  (KR) ............... 10-2006-0082550

(51) Int. Cl.
*H01H 31/10*   (2006.01)
(52) U.S. Cl. ..................................... 307/115
(58) Field of Classification Search ............. 307/115
See application file for complete search history.

(56) References Cited

U.S. PATENT DOCUMENTS

| | | | |
|---|---|---|---|
| 4,140,952 A * | 2/1979 | Miller | 318/478 |
| 5,345,360 A | 9/1994 | Crane | |
| 5,844,326 A * | 12/1998 | Proctor et al. | 307/34 |
| 6,590,304 B1 * | 7/2003 | Manning et al. | 307/131 |
| 6,940,272 B2 * | 9/2005 | Niv | 324/158.1 |
| 7,636,615 B2 * | 12/2009 | Pfingsten et al. | 700/286 |
| 7,652,395 B2 * | 1/2010 | Von Arx et al. | 307/112 |
| 2003/0042796 A1 * | 3/2003 | Siu | 307/39 |
| 2007/0038334 A1 * | 2/2007 | Chou et al. | 700/292 |

FOREIGN PATENT DOCUMENTS

| | | |
|---|---|---|
| JP | 06-291869 | 10/1994 |
| JP | 10-003962 | 1/1998 |
| JP | 2001-045660 | 2/2001 |
| JP | 2002-075562 | 3/2002 |
| WO | WO2004077729 | * 9/2004 |

* cited by examiner

*Primary Examiner*—Jared J Fureman
*Assistant Examiner*—Michael Rutland Wallis
(74) *Attorney, Agent, or Firm*—Lowe Hauptman Ham & Berner, LLP

(57) ABSTRACT

An electric socket is provided. The socket includes a power saving circuit determining operation status of an electronic apparatus or plural electronic apparatus connected to another electric socket according to a load signal to control to supply or automatically interrupt power. It is possible to control power according to operating status of the connected electronic apparatus and to control power supplied to the electronic apparatus connected to a home network. After time has elapsed when the electronic apparatus is not used, power is automatically interrupted so that undesired power consumption due to standby power can be prevented and costs thereof are significantly saved. The electronic apparatus is prevented from accident load inputted from the exterior so that the lifespan of the electronic apparatus can be elongated and user convenience is remarkably improved.

28 Claims, 14 Drawing Sheets

[Fig. 1]
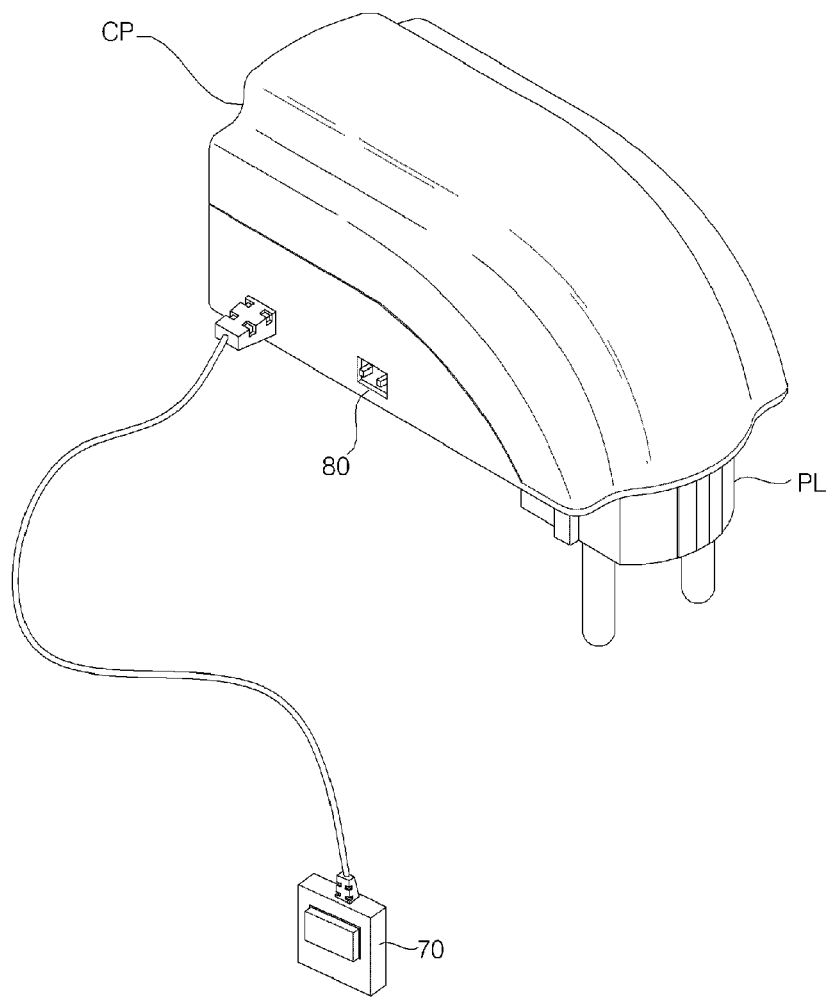
[Fig. 2]
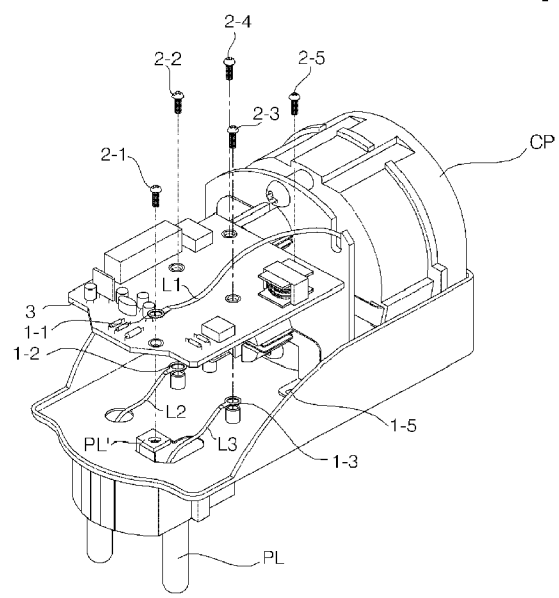

[Fig. 3]
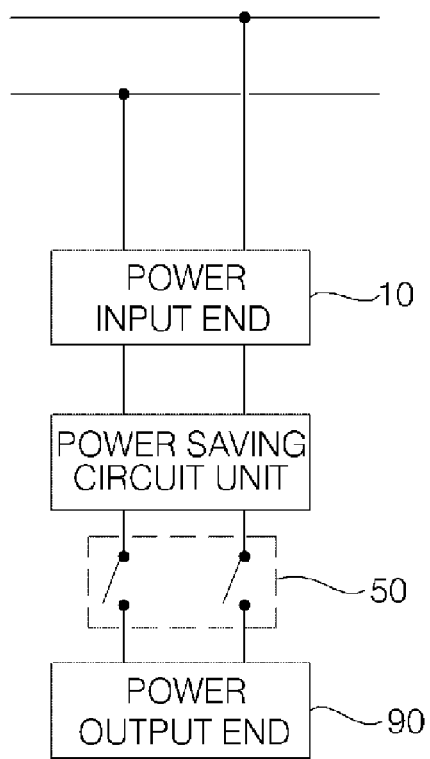
(a)
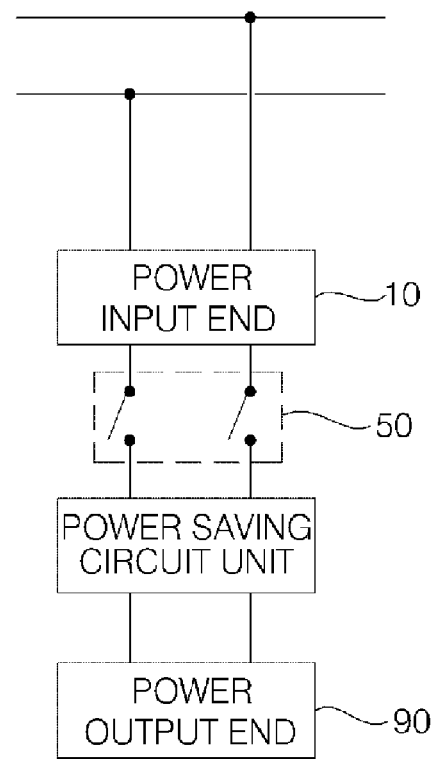
(b)

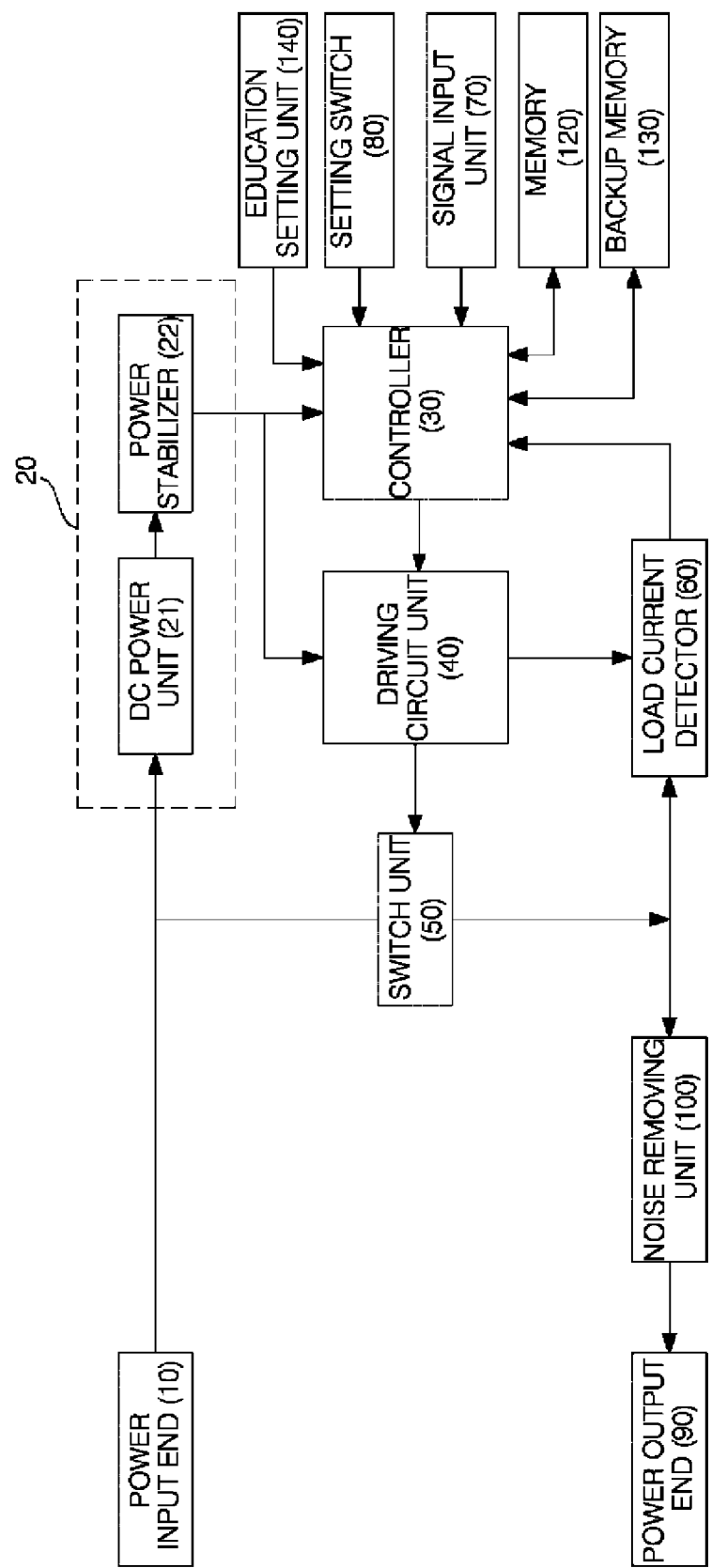
[Fig. 4]

[Fig. 5]
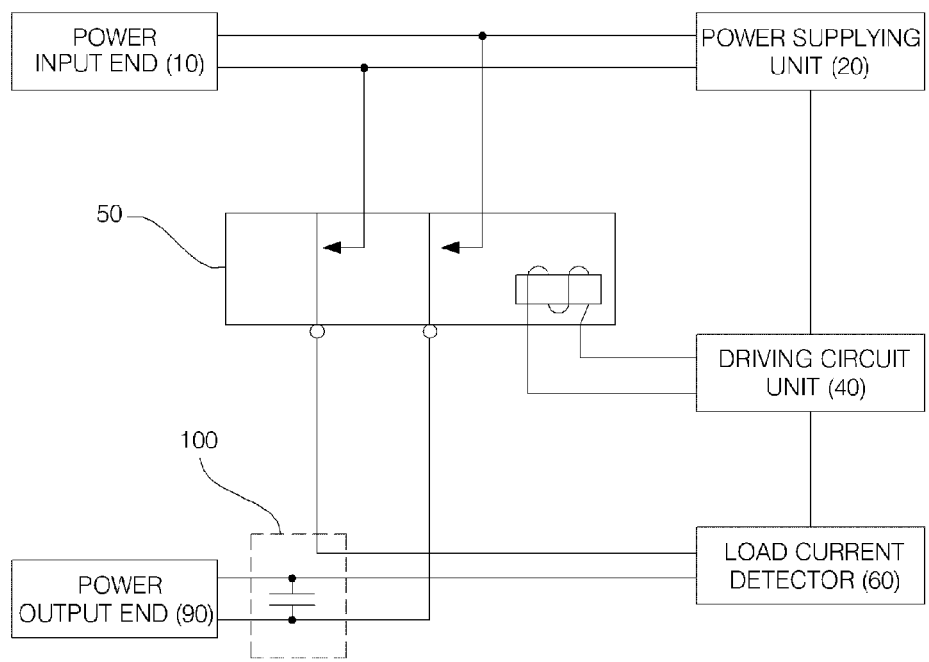
[Fig. 6]
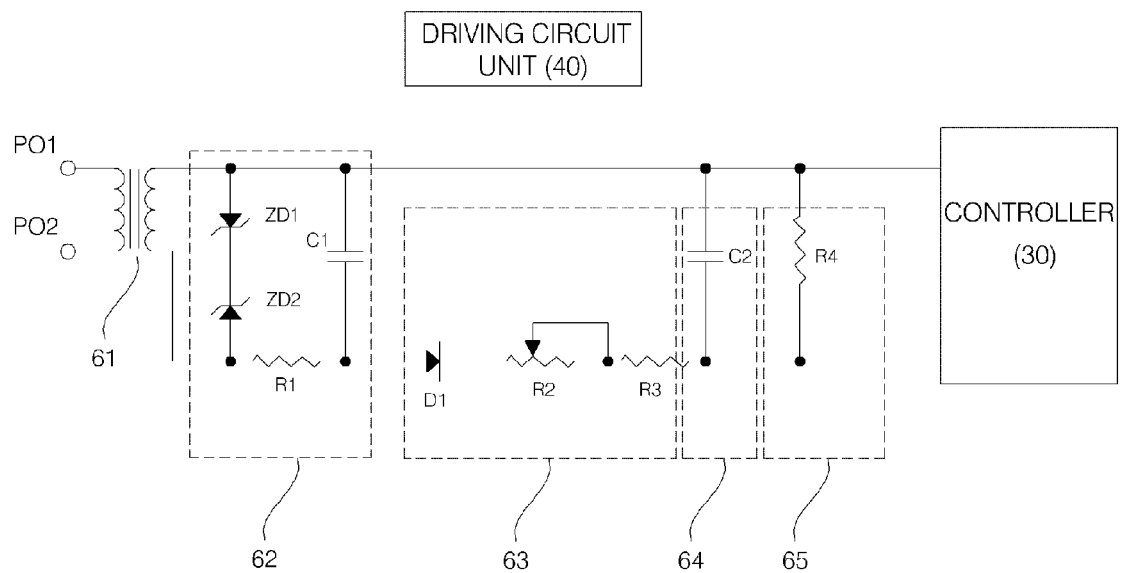

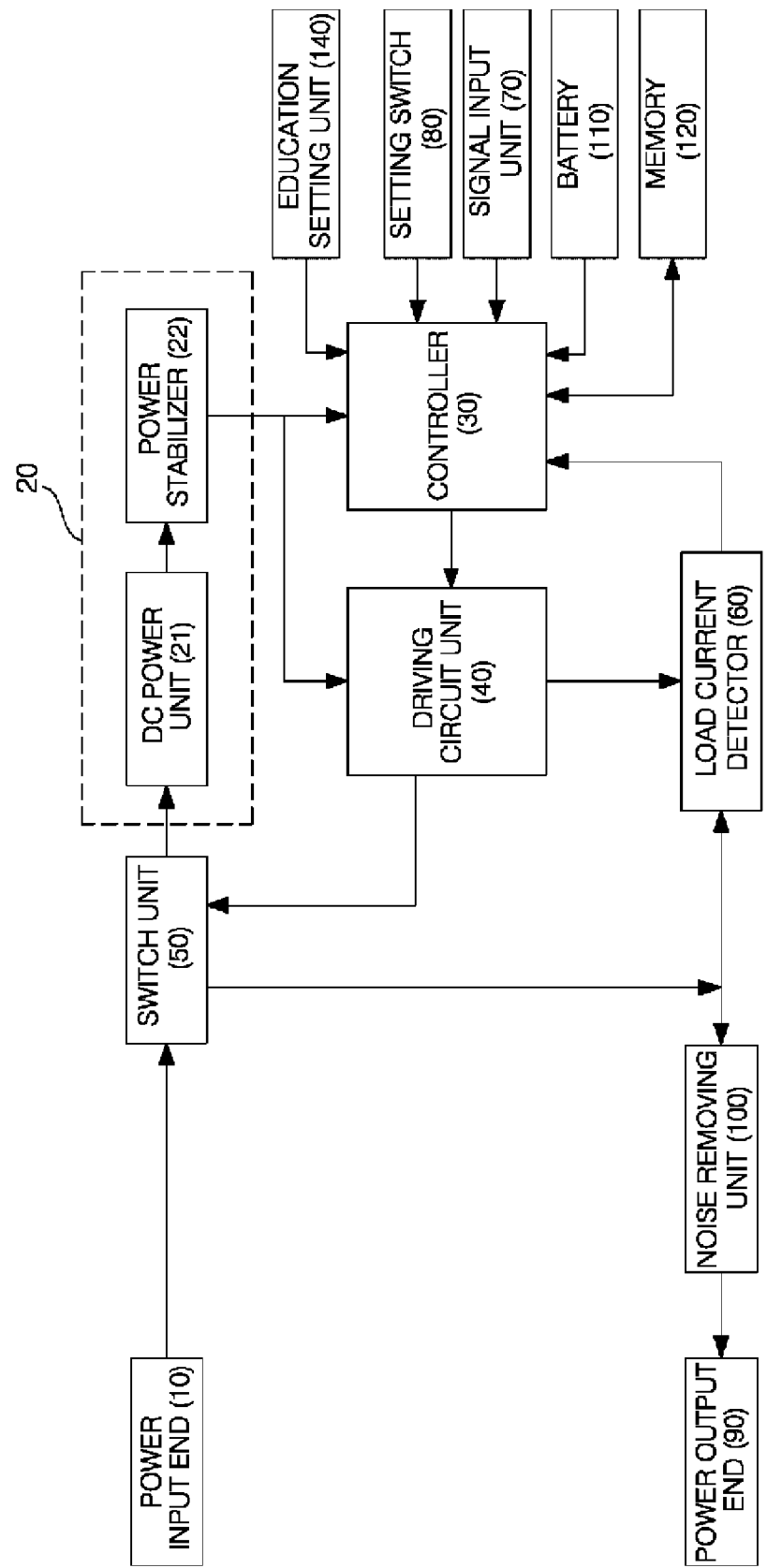
[Fig. 7]

[Fig. 8]
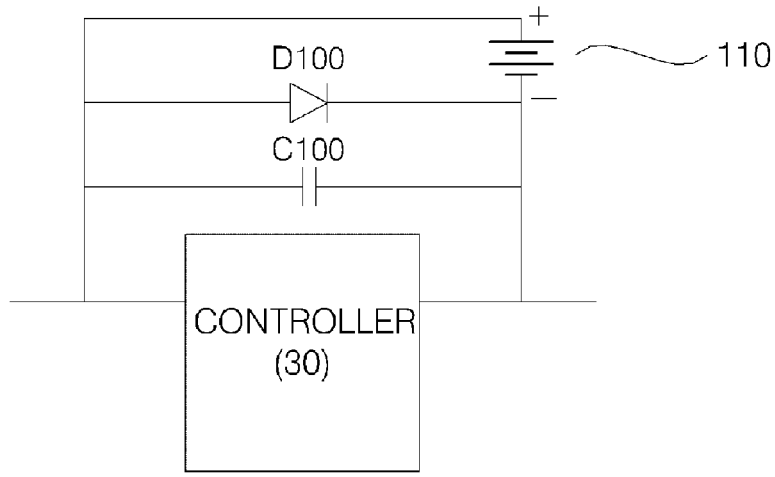
[Fig. 9]
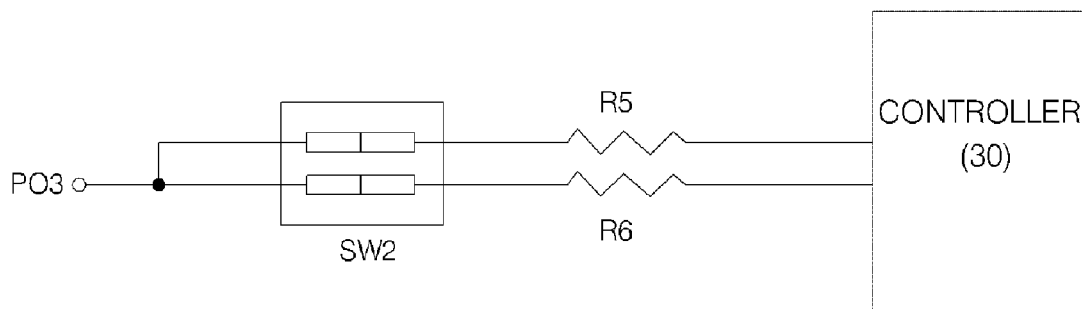
[Fig. 10]
| SETTING | REFERENCE VALUE OF STANDBY POWER INTERRUPTION |
|---|---|
| | 10W |
| | 20W |
| | 30W |
| | 40W |

[Fig. 11]
(a)
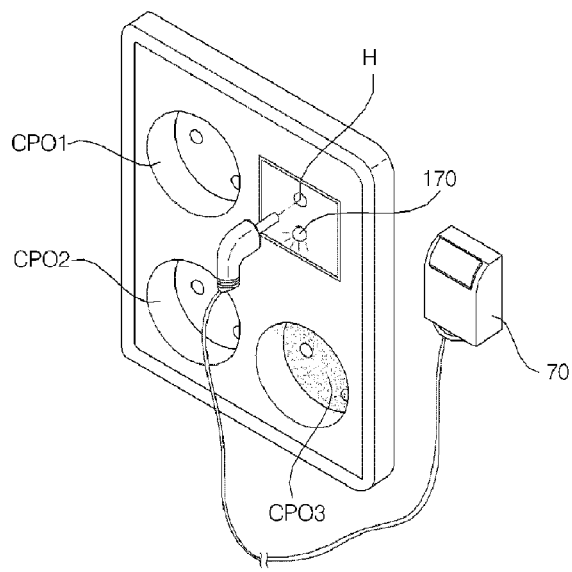
(b)
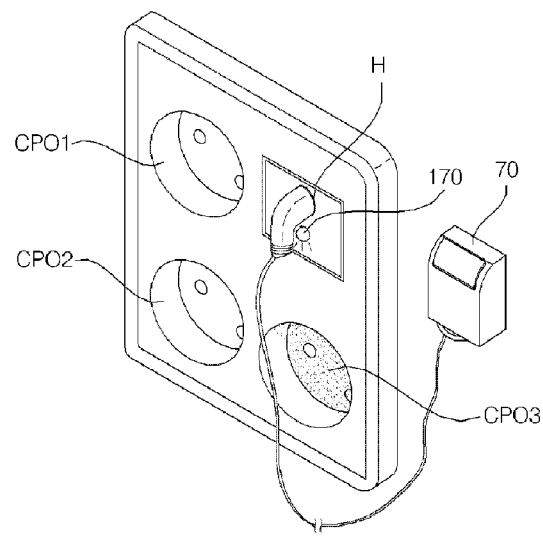
(c)
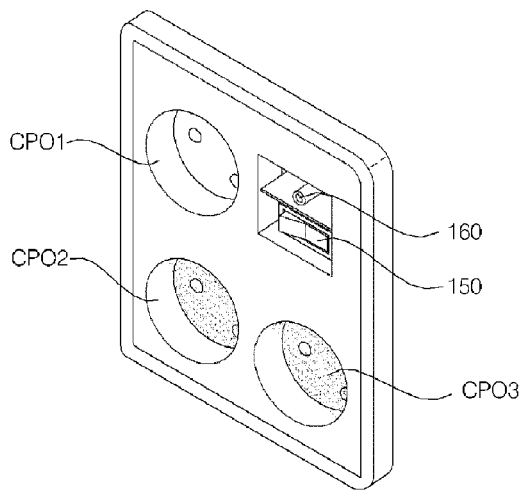
(d)
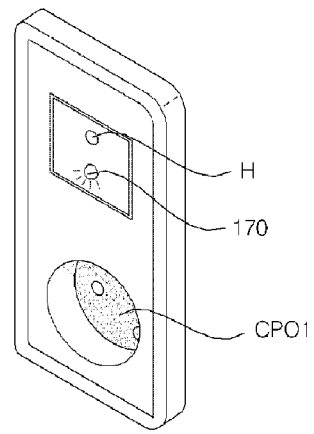

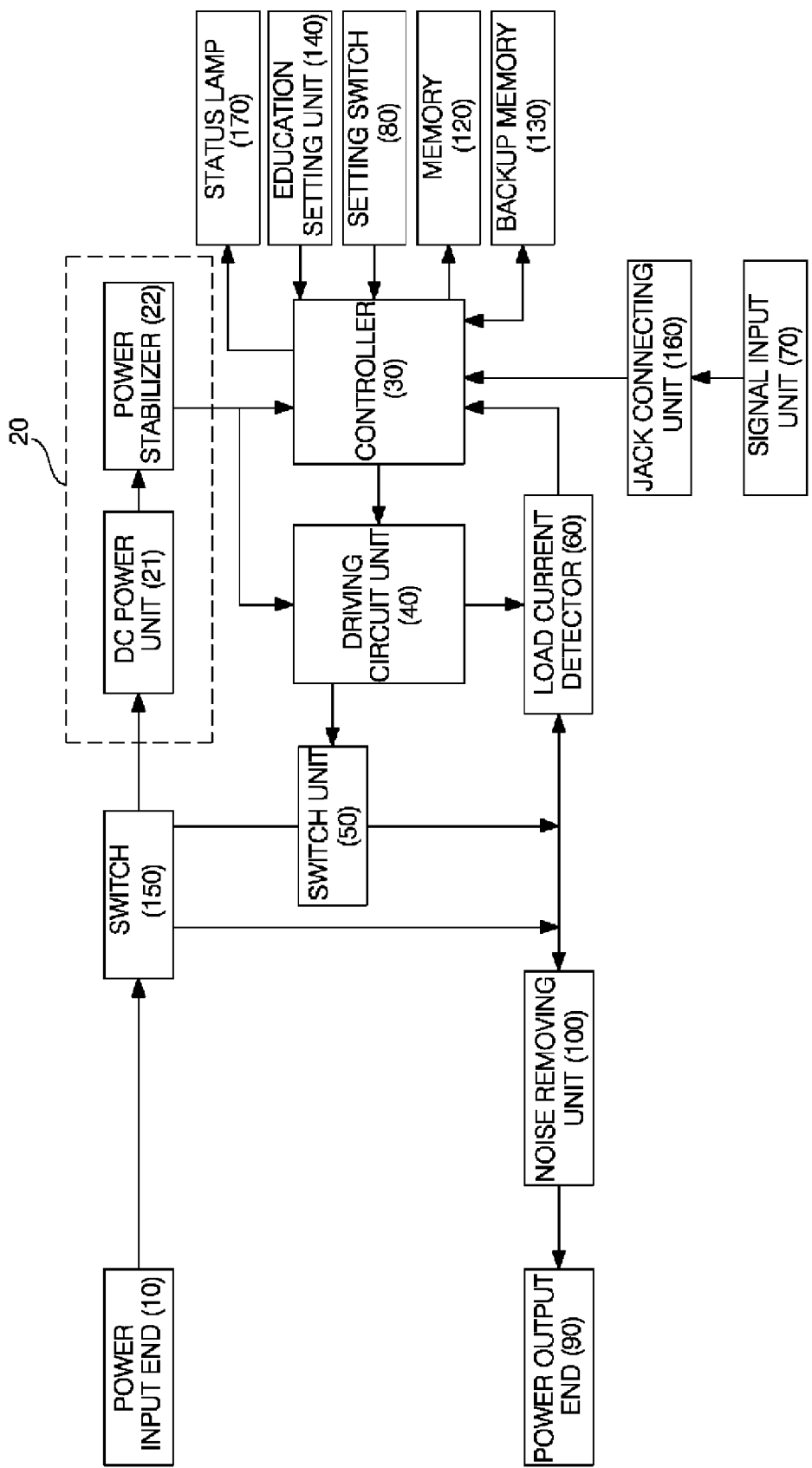
[Fig. 12]

[Fig. 13]
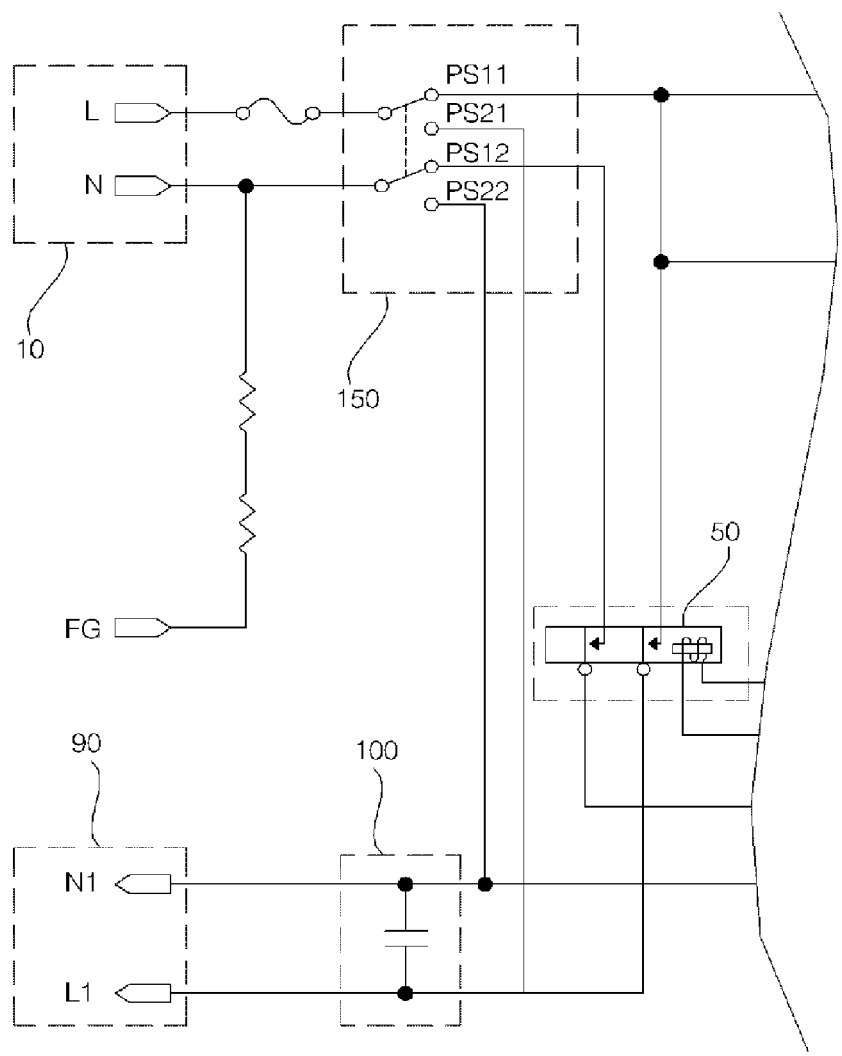
[Fig. 14]
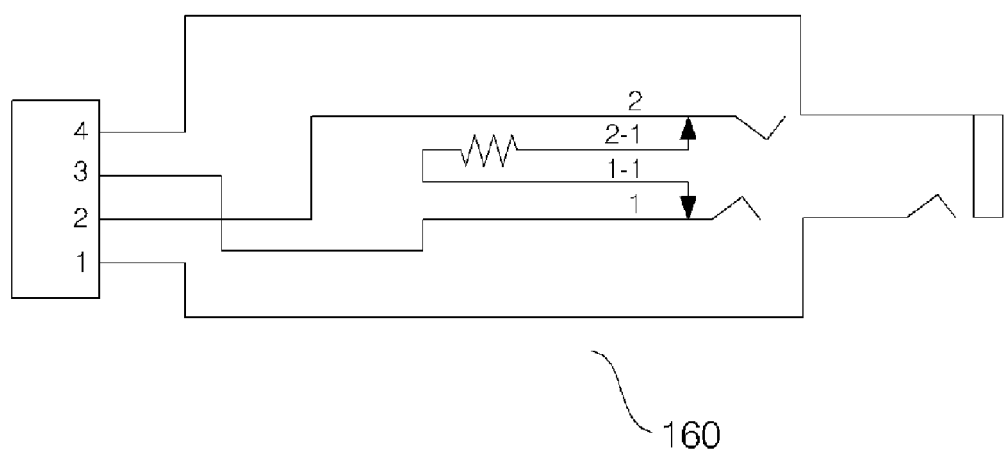

[Fig. 15]
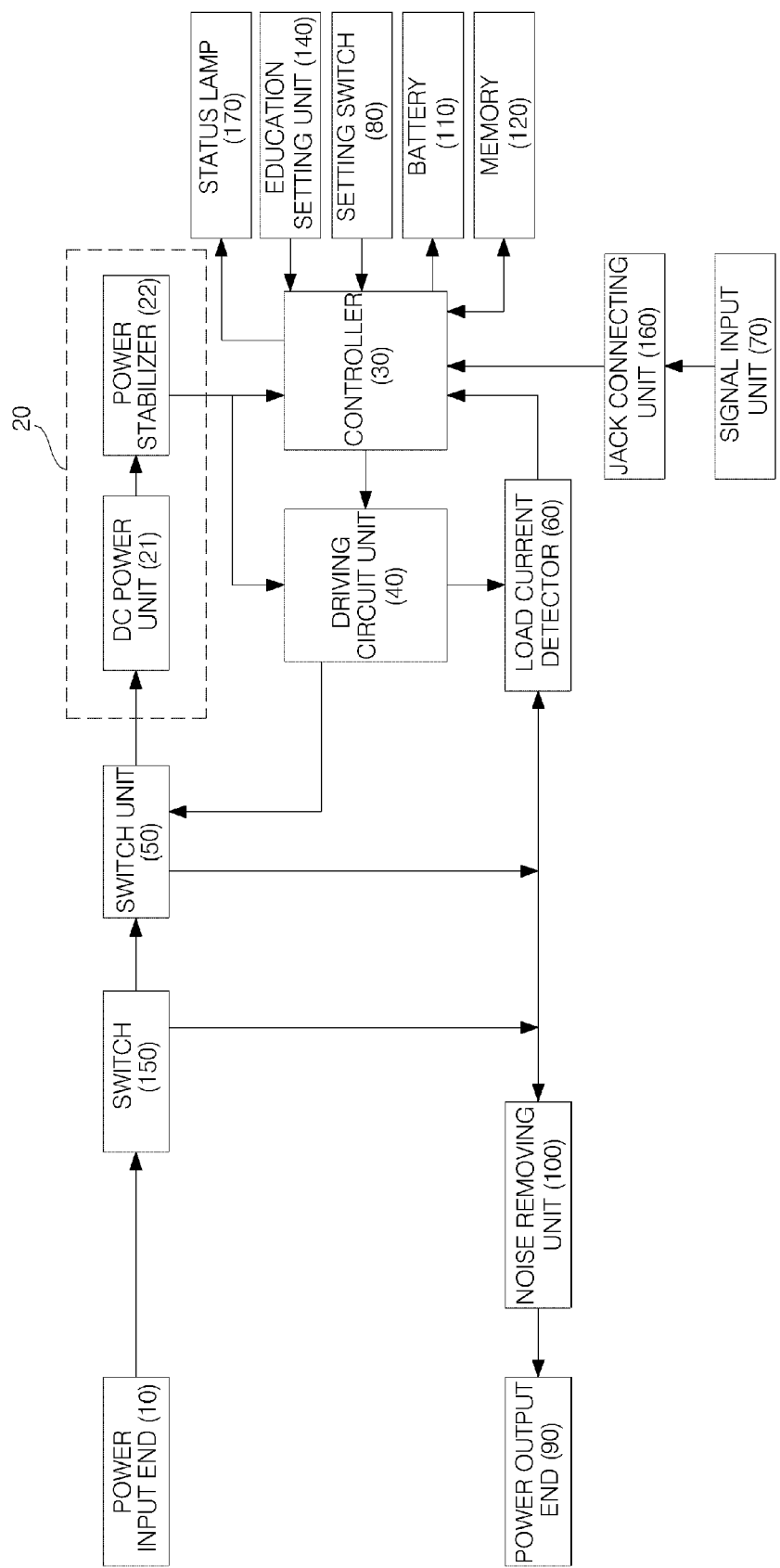

[Fig. 16]
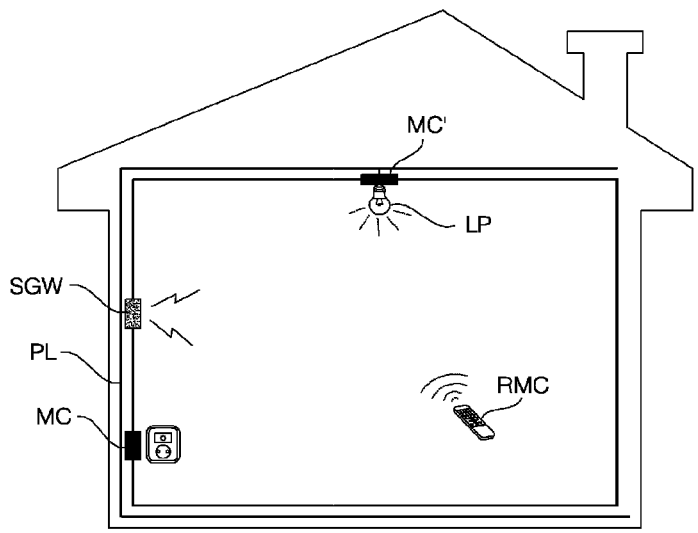
[Fig. 17]
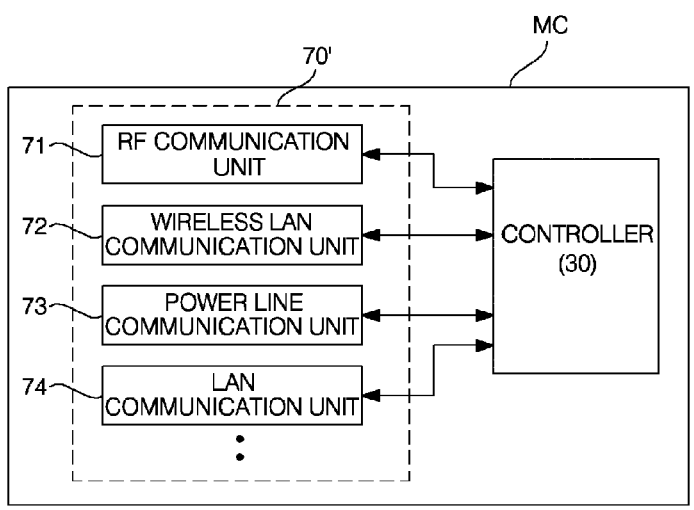
[Fig. 18]
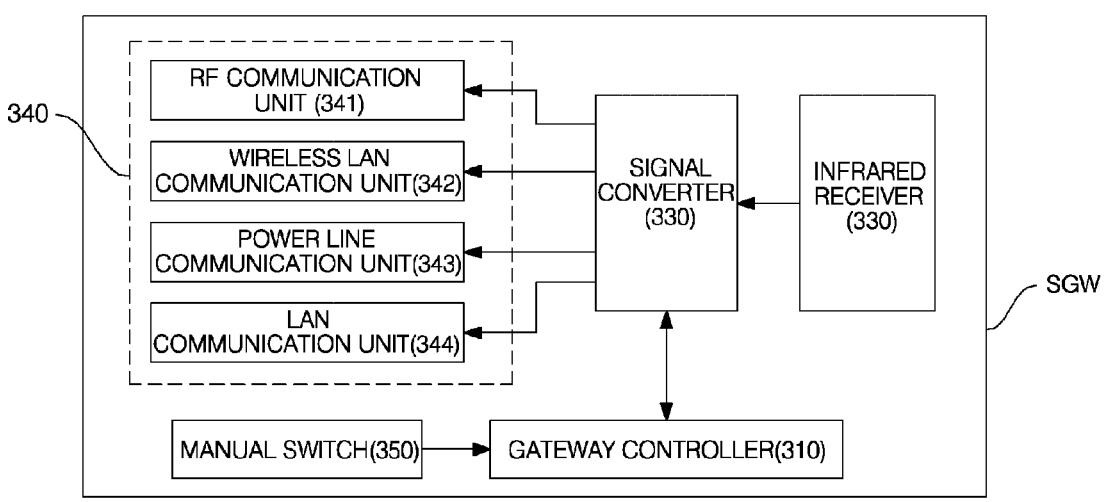

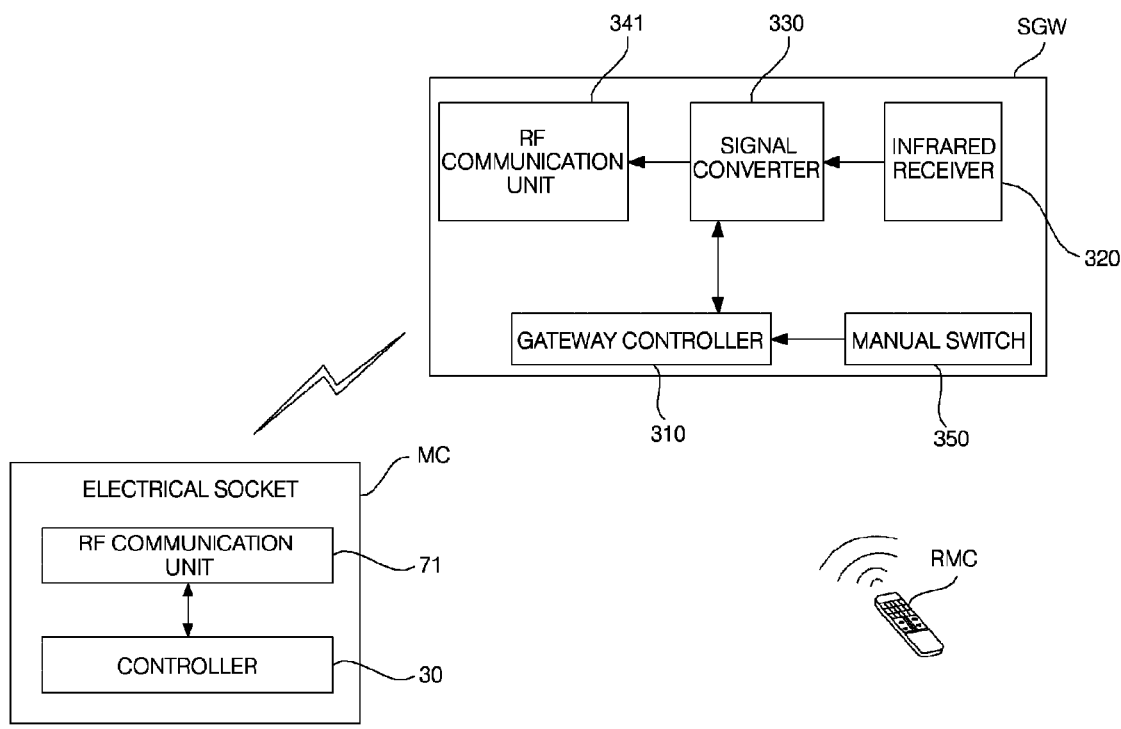
[Fig. 19]
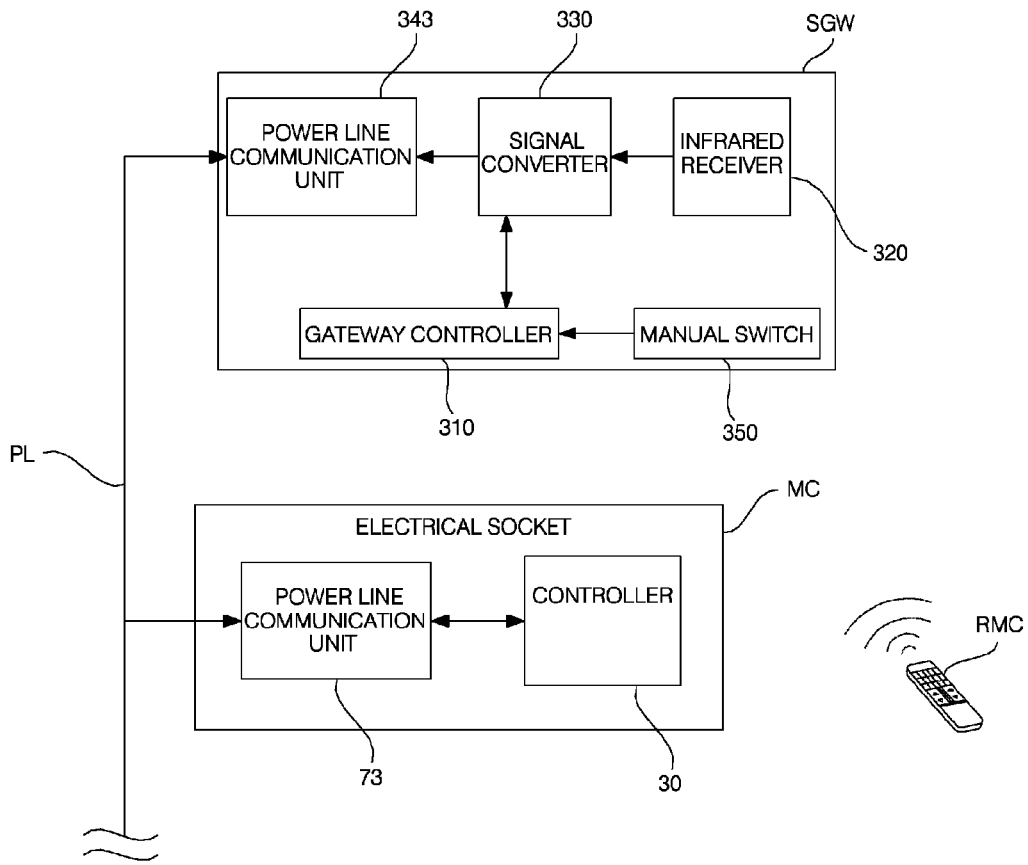
[Fig. 20]

[Fig. 21]
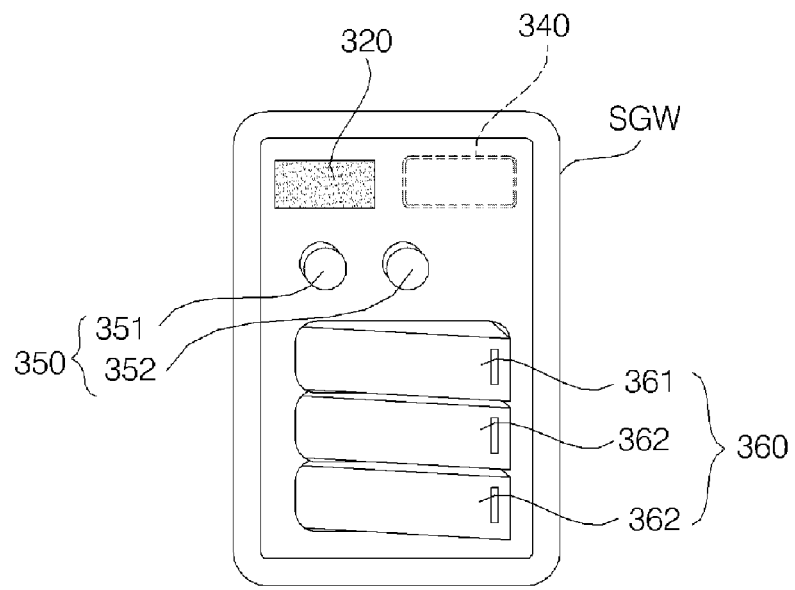
[Fig. 22]
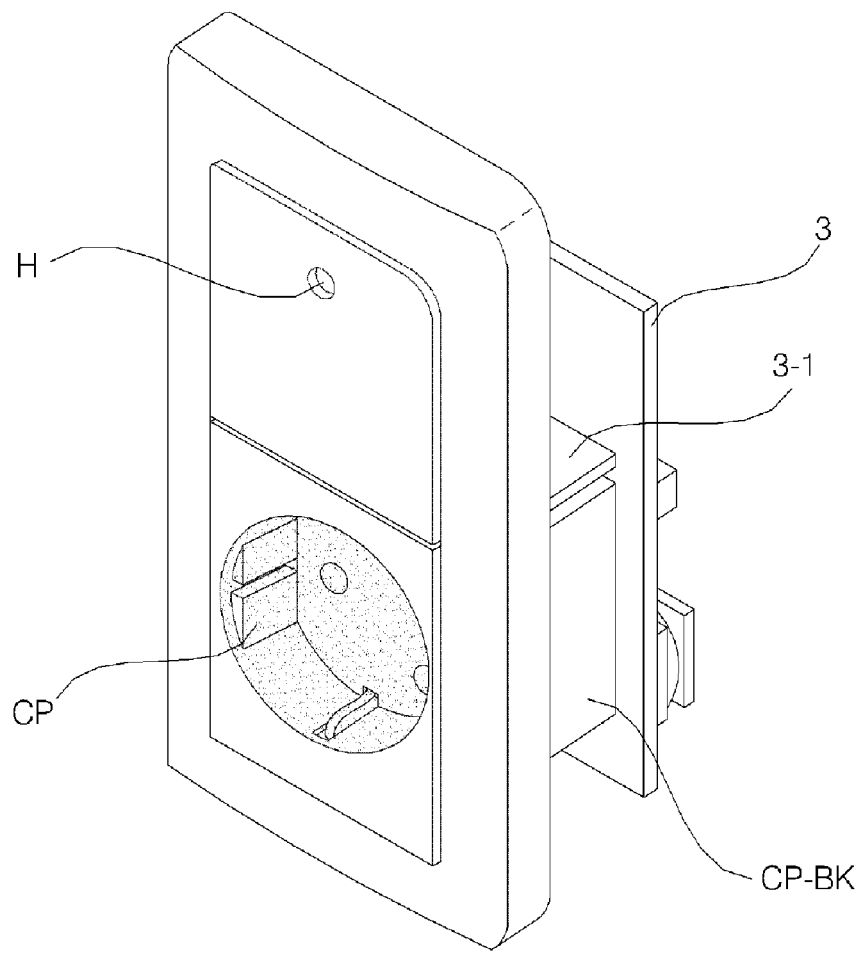

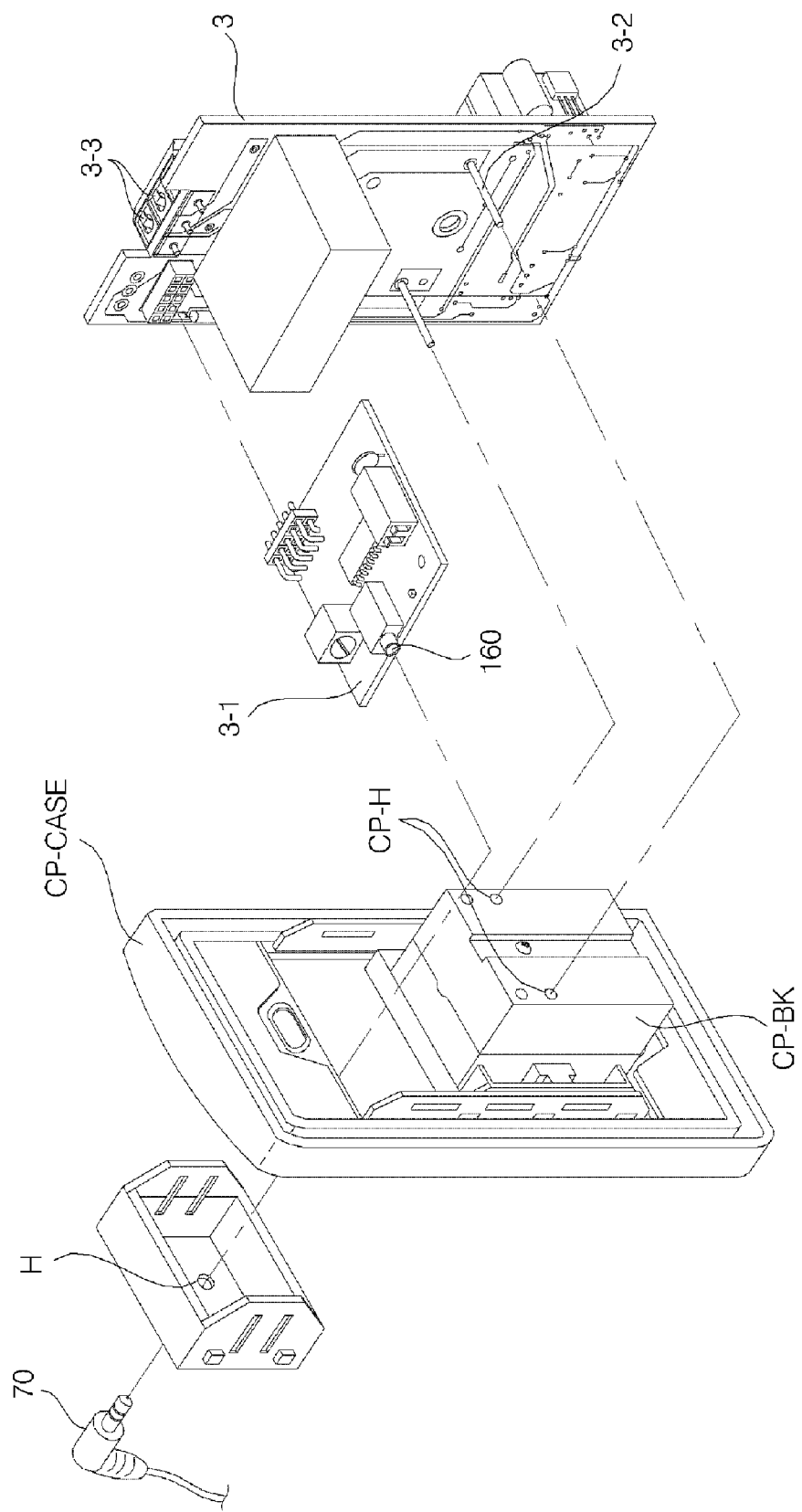
[Fig. 23]

AUTOMATICALLY STANDBY POWER CUT-OFF PLUG SOCKET

CROSS REFERENCE TO RELATED APPLICATION

This application claims the priority of Korean Patent Application No. 10-2005-0081857, filed on Sep. 2, 2005 and the priority of Korean Patent Application No. 10-2006-0082550, filed on Aug. 29, 2006 in the Korean Intellectual Property Office, the disclosure of which are incorporated herein in their entirety by reference. Further, this application is the National Phase application of International Application No. PCT/KR2006/003459, filed Aug. 31, 2006, which designates the United States and was published in English. This application, in its entirety, is incorporated herein by reference.

TECHNICAL FIELD

The present invention relates to a plug socket, and more particularly, to a plug socket for supplying power to a connected electronic apparatus to correspond to sensed load current or for automatically cutting off power to cut off standby power to the electronic apparatus regardless of the kind or number of connected electronic apparatuses.

BACKGROUND ART

In general, in the case of electronic apparatuses that are frequently used at home such as a TV, a computer, an electronic range, and an audio system, plugs are always plugged in a plug socket so that the plugs remain plugged in the plug socket when the electronic apparatuses are not used for a long time.

At this time, the electronic apparatuses consume a certain amount of standby power when they are not used so that unnecessary power consumption is generated. In order to prevent the standby current from being consumed, the plugs must be plugged out from the plug socket to prevent power from being supplied to the electronic apparatuses and the plugs must be plugged in the plug socket whenever the electronic apparatuses are used.

Therefore, a plug socket to which a switch is attached so that power can be supplied to/intercepted from the plug socket in which the plugs of the electronic apparatuses are plugged tends to be widely used.

However, in the conventional plug socket, a user must move to the plug socket whenever he or she manipulates the switch. Also, when one or more electronic apparatuses are connected to the plug socket, since the plug socket is commonly hided for appearance or safety so that it is difficult to manipulate the switch.

DISCLOSURE

Technical Problem

Therefore, the present invention has been made in view of the above and/or other problems, and it is an object of the present invention to provide a plug socket in which the load current of power supplied to an electronic apparatus is sensed to determine the operation state of the electronic apparatus so that the power is automatically supplied or intercepted in accordance with the operation state and in which, in the case where the plug socket is buried in a wall, a conversion switch is attached to change the plug socket into a plug socket to which the power is always supplied when a circuit is out of order in the plug socket so that it is possible to prevent power consumption caused by the standby power of the electronic apparatus and to completely prevent the consumption of the standby power that occupies no less than 10% of the entire power consumption at home.

Also, it is another object of the present invention to provide a plug socket in which wiring lines connected to transmit signals and to apply power in the plug socket are fastened and fixed without additional welding so that it is possible to easily disassemble/assemble a product, to easily receive A/S of a product, to improve productivity of a product, and to easily perform separate collection when a product is thrown away.

Technical Solution

In accordance with the present invention, the above and other aspects can be accomplished by the provision of an electric socket comprising: a switch unit for supplying power to be supplied to an electronic apparatus or another electric socket and interrupting the power therefrom; a setting switch manipulated to vary a load detecting value for interrupting the power and a delay time until the power is interrupted according a kind or a combination of connected electronic apparatuses; a signal input unit into which an operating signal is inputted such that the power is supplied to the electronic apparatus or another electric socket; a load current detector for detecting a load signal according to status of the electronic apparatus or another electric socket and inputting the load signal; and a controller for controlling the switch unit such to supply the power to the electronic apparatus or another electric socket when the operating signal is inputted from the signal input unit, and to automatically interrupt the power to be supplied to the electronic apparatus or another electric socket according to the load signal inputted from the load current detector.

In accordance with the present invention, the above and other aspects can be accomplished by the provision of a wall electrical socket comprising: at least one insertion opening into which plugs of an electronic apparatus or another electric socket are inserted; a power saving circuit for detecting a load value for the supplying or interruption of a power to supply and interrupt the power to and from the electronic apparatus connected to the insertion opening; a switch for switching the power to be directly supplied to the electronic apparatus or another electric socket when the power saving circuit is malfunctioned; and a jack connecting unit for supplying the power to the electronic apparatus or another electric socket directly or through the power saving circuit according to an installation status of a connecting jack when supplying the power to the electronic apparatus or another electric socket through the power saving circuit.

In accordance with the present invention, the above and other aspects can be accomplished by the provision of a wall electrical socket using a radio signal comprising: a main electric socket including a power saving circuit unit for detecting a load value of the connected electronic apparatus or another electric socket to supply or automatically interrupt the power to or from the connected electronic apparatus or another electric socket; and a signal gateway for converting an infrared operating signal to be received into an operating signal according to a desired communication protocol and for transmitting and inputting an operating signal the main electric socket.

In accordance with the present invention, the above and other aspects can be accomplished by the provision of a wall electrical socket comprising: a socket assembly having at least one insertion opening into which plugs of an electronic apparatus and another electric socket are inserted; and substrates in which a power saving circuit unit for supplying or automatically interrupting the supplying power to or from the electronic apparatus connected to the insertion opening or another electric socket is mounted; wherein the substrates are coupled with the rear side of the socket assembly by one of fitting or fastening.

Advantageous Effects

The electric socket of the present invention determines the status that an electronic apparatus or electronic apparatus connected to another electric socket is standby by detecting a load current so that power to be supplied is automatically interrupted after a predetermined time has elapsed. Since, although one or more electronic apparatuses having different power factor are connected to the electric socket, entire load detecting values can be varied so that the load detection and the load control are enabled even when electronic apparatuses having difference characteristics are combined. Therefore, the user convenience is remarkably improved and the power consumption consumed as the standby power is prevented so that energy and costs are significantly saved.

Moreover, the electric socket supplies power to the electronic apparatus connected to a network only at need so that undesired standby power consumption can be prevented. The consumption of the standby power remarkably increased due to use of a home network system can be significantly reduced so that it is effective to save the energy.

DESCRIPTION OF DRAWINGS

The above and other objects and features of the present invention will become apparent from the following description of a preferred embodiment given in conjunction with the accompanying drawings, in which:

FIG. 1 is a perspective view illustrating an integrated electric socket according to the present invention;

FIG. 2 is a perspective view illustrating a fastening structure of the electric socket according to the present invention;

FIG. 3 is block diagram illustrating the structures of electric sockets according to first and second embodiments of the present invention, respectively;

FIG. 4 is a block diagram illustrating the electric socket according to the first embodiment of the present invention;

FIG. 5 illustrates a noise removing unit and a switch unit of the electric socket according to the present invention;

FIG. 6 is a circuit diagram illustrating the structure of a load current detector of the electric socket according to the present invention;

FIG. 7 is a block diagram illustrating the structure of the electric socket according to the second embodiment of the present invention;

FIG. 8 is a view illustrating a battery connection structure of the electric socket according to the second embodiment of the present invention;

FIG. 9 is a circuit diagram illustrating a setting switch of the electric socket according to the present invention;

FIG. 10 is a view illustrating an example of a setting switch of the electric socket according to the present invention;

FIG. 11 is a perspective view illustrating the mounting structures of a wall electric socket and a signal input unit according to the present invention;

FIG. 12 is a block diagram illustrating a wall electric socket according to a first embodiment of the present invention;

FIG. 13 is a circuit diagram illustrating the switch and the noise removing unit of the wall electric socket according to the present invention;

FIG. 14 is a block diagram illustrating the structure of a jack connecting unit of the wall electric socket according to the present invention;

FIG. 15 is a block diagram illustrating a wall electric socket according to a second embodiment of the present invention;

FIG. 16 is a block diagram illustrating a wall electric socket according to a third embodiment of the present invention;

FIG. 17 is a block diagram illustrating a main electric socket of the wall electric socket according to the third embodiment of the present invention;

FIG. 18 is a block diagram illustrating the structure of a signal gateway of the wall electric socket according to the third embodiment of the present invention;

FIG. 19 is a view illustrating the structures of the main electric socket and the signal gateway according to radio frequency (RF) communication of the wall electric socket according to the present invention;

FIG. 20 is a view illustrating the structures of the main electric socket and the signal gateway according to the power line communication of the wall electric socket according to the present invention;

FIG. 21 is a view illustrating an example of the signal gateway of the wall electric socket according to the present invention;

FIG. 22 is a perspective view illustrating the wall electric socket according to the present invention; and FIG. 23 is an exploded perspective view illustrating the structure of the wall electric socket according to the present invention.

BEST MODE

Hereinafter, embodiments of the present invention will be described as follows with reference to the attached drawings. FIG. 1 is a perspective view illustrating an integrated electric socket according to the present invention. FIG. 2 is a perspective view illustrating a fastening structure of the electric socket according to the present invention.

As illustrated in FIGS. 1 and 2, the electric socket according to the present invention includes a plug PL plugged in another electric socket so that power is input, an insertion opening CP in which the plug of an electronic apparatus or another electric socket is inserted and from which the input power is output, a signal input unit connected by a lead wire so that a signal can be input from a remote and that the power is supplied to the electronic apparatus or another electric socket, and a switch 80 for setting a load detecting value and delay time in accordance with the operation state of the connected electronic apparatus or the operation state of a plurality of electronic apparatuses connected to another electric socket.

Also, the electric socket includes a substrate 3 that is connected to the signal input unit 70 and the switch 80 and on which a power saving circuit unit (not shown) for having the power input from the plug PL supplied to or interrupted from the electronic apparatus or another electric socket is mounted, power lines L1, L2, and L3 for connecting the plug PL and the power saving circuit unit to each other and for connecting the power saving circuit unit and the insertion opening CP to each other, and fastening members 2-1, 2-2, and 2-3 for fastening and fixing the power lines L1, L2, and L3 to the substrate 3.

Also, when the plug of the electronic apparatus or another electric socket is inserted into the insertion opening CP to be connected to the insertion opening CP, a conductive terminal (not shown) connected to the power saving circuit unit so that the power is output to the electronic apparatus or another electric socket is provided.

At this time, each of fastening units 1-1, 1-2, and 1-3 is formed in one of both ends of each of the power lines L1, L2, and L3. Holes or grooves are formed in the fastening units 1-1, 1-2, and 1-3. The power lines L1, L2, and L3 are fastened and fixed to the substrate 3 through the fastening members 2-1, 2-2, and 2-3 that passes through the fastening units 1-1, 1-2, and 1-3 to be connected to the power saving circuit unit.

The fastening members 2-1, 2-2, and 2-3 have the terminal PL of the plug PL, the power lines L1, L2, and L3, and the substrate 3 fastened and fixed to each other to be connected to each other without welding. At this time, a screw or a bolt may be used as the fastening members 2-1, 2-2, 2-3, 2-4, and 2-5.

Therefore, the plug sock can be connected to since the power lines L1, L2, and L3 or conductive terminals 6-1 and 6-2 are fastened and fixed by the screw or the bolt without welding.

The power saving circuit unit of the electric socket will be described as follows. FIG. 3 is block diagram illustrating the structures of electric sockets according to first and second embodiments of the present invention, respectively As illustrated in FIG. 3A, in the electric socket according to the first embodiment of the present invention, the power saving circuit unit and the switch unit 50 of the power saving circuit unit are connected to a power input end 10 to which the power is supplied to supply the power to or to interrupt the power from the electronic apparatus or another electric socket connected to a power output end 90. At this time, the switch unit 50 is included in the power saving circuit unit to be operated by the power saving circuit so that the power is supplied to or interrupted from in accordance with the load sensing value of the connected electronic apparatus or another electric socket.

As illustrated in FIG. 3B, in the electric socket according to the second embodiment of the present invention, the switch unit 50 is connected to the power input end 10 and the power saving circuit unit is connected to the switch unit 50 to supply the power to or to interrupt the power from the electronic apparatus or another electric socket connected to the power output end 90. At this time, when the power is cut interrupted by the switch unit 50, since the power supplied to the power saving circuit unit is interrupted, a battery for supplying operating power for driving the power saving circuit unit may be further provided.

The first and second embodiments of the above-described electric socket will be described in detail. FIG. 4 is a block diagram illustrating the electric socket according to the first embodiment of the present invention. FIG. 5 illustrates a noise removing unit and a switch unit of the electric socket according to the present invention.

As illustrated in FIG. 4, the electric socket includes the power input end 10 to which input power is applied, a power output end 90 from which the power is outputted to the connected electronic apparatus or another electric socket, a switch unit 50 connected to the power input end 10 and the power output end 90 to switch the power to be supplied to or interrupted from the electronic apparatus or another electric socket, a signal input unit 70 to which a driving signal is inputted such that the power is supplied to the electronic apparatus or another electric socket, a load current detector 60 for inputting a load signal detected from the power supplied by the switch unit 50, and a controller 30 for controlling the switch unit 50 according to a driving signal inputted from the signal input unit 70 or the load signal inputted from the load current detector 60.

Moreover, the electric socket further includes a power supplying unit 20 for converting power inputted from the power input end 10 to supply a driving power to the controller 30 and a driving circuit unit 40 for turning on/off by supplying the power to the switch unit 50 according to a control command of the controller 30.

In this case the electric socket further includes a setting switch 80 for setting a load detecting value as a reference value to automatically interrupt the power and to variably setting a delay time due to the power interruption, according to the load signal inputted from the load current detector 60.

Moreover, the electric socket further includes a noise removing unit 100 for absorbing and removing noise reversely inputted from the power output end 90, a memory 120 in which data set by a power saving circuit unit is stored, an education setting unit 140 for setting an education, and a status lamp (not shown) for indicating a status of supplying the power.

The power supplying unit 20 includes a direct current (DC) power unit 21 for converting an alternating current (AC) power supplied from the power input end 10 into a direct current (DC) power, and a power stabilizer 22 for stabilizing the DC power converted by the DC power unit 21. In this case, the power supplying unit 20 supplies the DC power to the controller 30 or the driving circuit unit 40 such that the power saving circuit unit works.

The signal input unit 70 includes an infrared module connected by a lead wire to receive an infrared signal or a button for applying a signal when the button is pressed. In this case, the signal input unit 70 inputs an operation signal to the controller 30 according to the received infrared signal or the button input such that the power is supplied to the electronic apparatus or another electric socket.

When the signal input unit 70 includes the infrared module, the infrared module is set to receive an infrared signal in a broad frequency band so that the signal input unit 70 supplies the operation signal to the controller 30 by receiving the infrared signal transmitted from a plurality of electronic apparatuses or a remote controller of an already operating electronic apparatus. Moreover, the signal input unit 70 can be set to receive only an infrared signal at a specific frequency to be educated, and in this case, supplies the operation signal to the controller 30 by recognizing only the signal set by the remote controller. In other words, the signal input unit 70 is capable of inputting a signal using remote controllers of a plurality of already using electronic apparatuses regardless of including a specific remote controller for the electric socket.

The driving circuit unit 40 supplies the power to the switch unit 50 or not according to the control command inputted from the controller 30 to operate the switch unit 50. Here, the driving circuit unit 40 includes a plurality of diodes, transistors, resistors, and capacitors, and supplies the power from the power supplying unit 20 to the switch unit 50 according to the control command of the controller 30 such that the switch unit 50 is turned on/off.

In this case, as the switch unit 50, a relay to be switched on/off by the power supplied by the driving circuit unit 40 is used, and otherwise a component capable of being switched such as a transistor may be used.

The memory 120 stores data for recognizing the operating signal, the load detecting value set by the controller 30, and a delay time to when the power is interrupted. Moreover, a backup memory 130 stores data optionally set and stored in the memory 120.

The status lamp is turned on in response to an interrupted state of the power being supplied to the electronic apparatus or another electric socket by the power saving circuit unit.

Moreover, the status lamp is controlled by the controller 30 and turned off when an input signal inputted from the signal input unit 70 is inputted over a predetermined time period.

As illustrated in FIG. 5, the noise removing unit 100 is connected between the switch unit 50 and the power output end 90, and particularly includes an AC capacitor C10 connected to both poles of the power output end 90. The noise removing unit 100 absorbs and removes noise inputted from the electronic apparatus connected through the signal output end 90 or another electric socket.

The load current detector 60 detects load current from the supplying power when the power is supplied to the electronic apparatus or another electric socket by turning the switch unit 50 on, removes power noise or overvoltage containing in the power, converts the same into DC, and inputs a load signal for determining an operating state of the electronic apparatus or another electric socket to the controller 30.

When the operating signal is inputted from the signal input unit 70, the controller 30 generates a control command such that the switch unit 50 is turned on to supply power to the electronic apparatus or another electric socket and supplies the control command to the driving circuit unit 40. The controller 30 determines the operating state of an electronic apparatus or a plurality of electronic apparatuses connected another electric sockets according to the load signal inputted from the load current detector 60, generates a control command such that the supplying power is automatically supplied or interrupted, and supplies the same to the driving circuit unit 40.

When the education setting unit 140 is manipulated to recognize the operating signal at a predetermined frequency, the controller 30 stores the signal inputted through the signal input unit 70 such that the stored operating signal can be recognized. At that time, when the education setting unit 140 including a specific button or a dip switch is manipulated, the controller 30 stores the frequency of the operating signal inputted through the signal input unit 70 to recognize that the operating signal at the same frequency as the stored frequency is inputted. In other words, when the operating signal at the specific frequency among the operating signals inputted through the signal input unit 70 is inputted, the controller 30 controls the power to be supplied to the electronic apparatus or another electric socket.

Meanwhile, when the input signal inputted from the signal input unit 70 is inputted over a predetermined time, the controller 30 controls the load current detector 60 such that the standby power consumed by the connected electronic apparatus or another electric socket is measured for a predetermined time period. At that time, the controller 30 controls the status lamp to be turned on or off.

The controller 30 automatically sets the load detecting value for interrupting the power and the delay time until the power is interrupted in response to the scale of the standby power measured by the load current detector 60. In other words, when a specific load value is not set by the setting switch, the controller 30 sets the load detecting value for the automatically interrupting the power according to the value of the standby power measured as described above. The load detecting value set by the controller 30 and the delay time until the power is interrupted are stored in the memory 120.

The controller 30 compares the load signal inputted from the load current detector 60 with the set load detecting value according to the setting of the setting switch 80 or the automatic setting due to the detection of the standby power, determines that the power is the standby power because an electronic apparatus or a plurality of electronic apparatuses connected to another electric is powered off when the load signal is less than the load detecting value, and controls that the power supplied after a predetermined time elapsed is automatically interrupted.

At that time, the controller 30 determines the load signal due to the load current detector 60 and generates a control signal for the operation control of the switch unit 50 after the set delay time has elapsed to transmit the control signal to the driving circuit unit 40.

FIG. 6 is a circuit diagram illustrating the structure of a load current detector of the electric socket according to the present invention. As illustrated in FIG. 6, the load current detector 60 includes a current detecting transformer 61 having an end P01 connected to the switch unit 50 and the other end PO2 connected to the power output end 90 to detect the load current from the supplying power, an overvoltage removing unit 62 for removing overvoltage or overcurrent contained in the AC power inputted from the current detecting transformer 61, a converting unit 63 for converting the AC voltage outputted from the overvoltage removing unit 62 into a ripple power, a smoothing unit 64 for smoothing the ripple power and supplying an AC load signal to the controller 30. Moreover, the load current detector 60 further includes a discharging unit 65 having at least one resistor R4 and rapidly detecting varying load current because the load current detected by the current detecting transformer 61 is continuously varied.

When the AC load signal is inputted to the controller 30 through the smoothing unit 64, the overvoltage removing unit 62 absorbs and removes noise or momentary overvoltage contained in the power in order to decrease detecting error due to the determination of the load signal by the controller 30. In this case, the overvoltage removing unit 62 includes one or more diodes, one or more capacitors, and one or more resistors.

The overvoltage removing unit 62 includes a first diode ZD1, a second diode ZD2 reversely connected to the first diode ZD1 in series, and a first capacitor C1 connected to the first and second diodes ZD1 and ZD2 in parallel. Moreover, the overvoltage removing unit 62 includes a first resistor R1 having an end connected to an anode of the second diode ZD2 and the other end connected to the first capacitor C1.

Here, the first and second diodes ZD1 and ZD2 absorb and remove the momentary overvoltage momentarily generated for a short time less than a few micro seconds. At that time, the first and second diodes ZD1 and ZD2 can remove the momentary overvoltage greater than about 18 V and employ Zener diodes. The first capacitor C1 and the first resistor R1 absorb and remove the momentary overvoltage generated for every 0.1 mm second.

Here, a power factor of the electronic apparatus has different values according to the kind of the electronic apparatus or manufactures. When one or more electronic apparatuses having different power factors are connected to an electric socket, the momentary overvoltage may occur due to the power factor difference of the electronic apparatuses.

At that time, the overvoltage removing unit 62 absorbs and removes the momentary overvoltage generated due to a difference between the power factors so that the load current can be detected within a minimal error range even when a plurality of different electronic apparatuses is complicatedly used.

The converting unit 63 includes a diode and one or more resistors and converts the AC voltage outputted from the overvoltage removing unit 62 into the ripple voltage. Particularly, the converting unit 63 includes a third diode D1, a variable resistor R2 capable of varying a resistance value to vary voltage to be supplied, and a third resistor R3. The third diode D1 has an anode connected to the overvoltage removing unit 62 and a cathode connected to the variable resistor R2. In this case, a germanium diode having a low voltage drop in comparison to other diodes and excellent linearity is used as the third diode D1.

The smoothing unit 64 smoothes the voltage converted into the ripple voltage by the converting unit 63 using the charging and discharging characteristics of the capacitor C2 and supplies a DC load signal to the controller 30.

Thus, the load current detector 60 detects the load current and converts the detected load current into a stable DC load signal to supply the same to the controller 30.

A second embodiment of the power saving circuit unit of the electric socket according to the present invention will be described as follows. FIG. 7 is a block diagram illustrating the structure of the electric socket according to the second embodiment of the present invention and FIG. 8 is a view illustrating a battery connection structure of the electric socket according to the second embodiment of the present invention.

The electric socket according to the second embodiment of the present invention, as illustrated in FIG. 7, includes a power input end 10, a power output end 90, a switch unit 50, a signal input unit 70, a load current detector 60, a controller 30, a driving circuit unit 40, and a noise removing unit 100. Moreover, the electric socket further includes a battery 110 for supplying power to the controller 30 when the power is interrupted, a memory 120, an education setting unit 140, and a status lamp.

In the electric socket according to the second embodiment of the present invention, similar components as the first embodiment are assigned by same names and same reference numeral, and their description will be omitted.

The switch unit 50 is connected between the power input end 10 and the power output end 90 to supply the power to be supplied to an electronic apparatus connected to an insertion opening or other electronic apparatuses according to a control command of the controller 30 or to automatically interrupt the power from the same. At that time, the switch unit 50 is connected between the power input end 10 and a power supplying unit 20 to interrupt the power to be supplied to the power supplying unit 20 when the power to be supplied to the electronic apparatus or another electric socket is interrupted.

As illustrated in FIG. 8, the battery 110 is connected to an input terminal of and an out terminal of the controller 30 to supply a driving power to the controller 30 when the power is interrupted by the switch unit 50. Moreover, the battery 110 prevents data stored in the memory 120 from loosing. In this case, ends of the battery 110 are connected to the controller 30 through a diode and a capacitor, and a rechargeable battery may be used as the battery 110.

FIG. 9 is a circuit diagram illustrating a setting switch of the electric socket according to the present invention.

In the first and second embodiments of the present invention, as illustrated in FIG. 9, the setting switch 80 can vary a load detecting value for comparing a load signal such that the power is automatically interrupted and a delay time until the power is interrupted according to a manipulation position of the switch, and a dip-switch is used as the setting switch 80.

In this case, the setting switch 80 can be selectively set by a user according to an electronic apparatus connected to the electric socket or a kind of a plurality of electronic apparatuses connected to another electric socket, and the load detecting value and the delay time are determined according to the setting. Moreover, the setting switch 80 can be set as a timer. For example, the setting switch 80 can be set such that the power is automatically interrupted after a predetermined time has elapsed without an additional input signal or determination.

The setting switch 80 is connected to the controller 30 via a resistor and an end PO3 is connected to the power supplying unit 20 such that the power supplied from the power supplying unit 20 according to the manipulation position of the switch is supplied to a fifth resistor R5 and a sixth resistor R6 having different resistance and different signals are inputted to the controller 30 even at same position of the switch.

For example, when a first switch SW1 of the setting switch 80 is turned on, voltage is supplied from the power supplying unit 20 to the fifth resistor R5 such that a first setting signal is inputted to the controller 30. When a second switch SW2 is turned on, voltage is supplied to the sixth resistor R6 so that a second setting signal is inputted to the controller 30.

Hereinafter, an example of the setting of the load detecting value using the setting switch 80 will be described as follows. FIG. 10 is a view illustrating an example of the setting switch of the electric socket according to the present invention.

As illustrated in FIG. 10, when the first switch SW1 of the setting switch 80 is turned on and the second switch SW2 of the setting switch 80 is turned off, a reference value for automatically interrupting the power is set to 10 W as a power value of the load detecting value. Moreover, when the first and second switches SW1 and SW2 of the setting switch 80 are turned on, the reference value for interrupting the standby power is set to 20 W.

When the first and second switches SW1 and SW2 of the setting switch 80 are turned off, the reference value for interrupting the standby power is set to 30 W, and set to 40 W when the first switch SW1 is turned off and the second switch SW2 is turned on.

In this case, the above values are only examples, and may be changed according to a connected electronic apparatus and a kind of another electric socket.

In the electric socket, when an electronic apparatus such as a TV is powered off and the power becomes the standby power by manipulating the setting switch 80, the controller 30 determines operating statuses of the TV and another electronic apparatuses according to the load signal detected and inputted by the load current detector 60 and automatically interrupts the power to be supplied to the TV and another electronic apparatuses.

Here, as the first and second switches SW1 and SW2 of the setting switch 80 are turned on/off, the reference value for determining the operation statuses of the electronic apparatus such as the standby power status or a normal operation, that is, the load detecting value is varied, and the delay time until the power is automatically interrupted is also set different.

Therefore, when the electronic apparatus and another electric socket are power off and the power is the standby power, the electric socket determines the operating state of an electronic apparatus or a plurality of electronic apparatuses connected to another electric socket by detecting the load current and automatically interrupts the power to be supplied after the predetermined time has elapsed.

The electric socket according to another embodiment of the present invention will be described with reference to the drawings as follows. FIG. 11 is a perspective view illustrating the mounting structures of a wall electric socket and a signal input unit according to the present invention.

The wall electric socket (hereinafter, referred to as an 'electric socket' may be embedded in an indoor wall of a building.

In the electric socket embedded in a building, as illustrated in FIGS. 11a to 11d, one or more insertion openings CP01 to CP03 connected to one or more electronic apparatuses or another electric socket are provided in the front side of the electric socket, and a power saving circuit unit is installed in the rear side of the insertion openings CP01 to CP03 to supply or interrupt the power to or from the connected electronic apparatuses or another electric socket.

When one or more insertion openings CP01 to CP03 are provided, the electric socket is configured such that one or more insertion openings are connected to the power saving circuit unit.

Here, when a plurality of insertion openings CP01 to CP03 is provided, at least one power saving insertion opening to which the power saving circuit unit is connected is provided and at least one normal power insertion opening is provided and selectively used by a user. In this case, the power insertion opening is different from the power saving insertion opening by at least one of color, pattern, and shape such that the power insertion opening is easily distinguished from the power saving insertion opening.

The electric socket includes a switch 150 for switching the power to be supplied to the electronic apparatus or another electric socket through the power saving circuit unit or directly supplied to the electronic apparatus or another electric socket without passing through the power saving circuit unit. Moreover, when the power is supplied to the electronic apparatus or another electric socket through the power saving circuit unit, the electric socket further includes a jack connecting unit 160 to supply the power to the electronic apparatus or another electric socket directly or through the power saving circuit unit, according to the installation state of a connecting jack.

Moreover, the electric socket further includes a status lamp 170 turned on in response to the status of the power to be supplied to the electronic apparatus or another electric socket being interrupted by the power saving circuit unit.

In this case, as illustrated in FIGS. 11a and 11b, the jack connecting unit 160 is configured such that a connecting jack penetrating an insertion hole H formed at one of the upper, lower, left, and right sides of the insertion openings CP01 to CP03 can be inserted and connected.

Moreover, the electric socket includes a signal input unit 70 detachably attached to a front case and connected by a lead wire to supply a driving signal at a remote place such that the power is supplied from the electric socket to the connected electronic apparatus or another electric socket, and a setting switch 80 for setting a load detecting value and a delay time according to the connected electronic apparatus or another electric socket.

The signal input unit 70 includes an infrared module connected by a lead wire to receive an infrared signal or a button for applying a signal when the button is pressed. In this case, the signal input unit 70 includes a connecting jack inserted into the jack connecting unit 160 and is attached to and detached from the jack connecting unit 160.

Here, in the signal input unit 70, when the connecting jack is inserted to be installed in the jack connecting unit 160, an installation signal due to the installation is supplied to the power saving circuit unit to input a predetermined operating signal. In this case, the signal input unit 70 may be configured in the attachable type, or in the form of being fixed to the electric socket and accommodated in a spaced thereof.

The switch 150, as illustrated in FIG. 11c, may be provided at one of the upper, lower, left, and right sides of the insertion openings CP01 to CP03, and the position thereof is not limited in the drawings. The switch 150 may be included in the switch unit 50. Moreover, the electric socket may be configured such that the switch 150 is disposed front or inside to be manipulated when the front case is detached.

Particularly, when the power saving circuit unit is abnormal or malfunctioned, the switch 150 is switched to operate as an electric socket capable of supplying the power by supplying the power directly to the electronic apparatus connected to the insertion openings CP01 to CP03 or another electric socket.

FIG. 12 is a block diagram illustrating the wall electric socket according to a first embodiment of the present invention.

The electric socket embedded in the indoor wall, as illustrated in FIG. 12, includes a power input end 10, a power output end 90, the setting switch 80, a signal input unit 70, a switch unit 50, a driving circuit unit 40, a load current detector 60, and a controller 30. Moreover, the electric socket further includes a noise removing unit 100, a memory 120, a backup memory 130, an education setting unit 140, a switch 150, a jack connecting unit 160, and a status lamp 170.

In the electric socket according to the second embodiment of the present invention, similar components as the first and second embodiments are assigned by same names and same reference numeral, and their description will be omitted.

Moreover, the electric socket includes at least one communication unit for supplying an operating signal to the controller by transmitting and receiving data using a communication device in addition to the signal input unit 70.

The switch 150 supplies the power directly to the electronic apparatus or another electric socket when the power saving circuit unit is abnormal.

At that time, the controller 30 detects the installation state of the jack connecting unit 160 to supply or automatically interrupt the power to the electronic apparatus or another electric socket when the signal input unit 70 is installed in the jack connecting unit 160 and to supply the power directly to the electronic apparatus or another electric socket when the signal input unit 70 is not installed. In other words, the controller 30 supplies or automatically interrupts the power according to the installation state of the jack connecting unit 160 while the power is supplied to the connected electronic apparatus or another electric socket.

Since the operation of the controller 30 to supply or interrupt the power is identical to the above-description, the detailed description thereof will be omitted.

The electric socket may further include a power line communication unit (not shown) for receiving data contained in the power and converting the same into new data being readable by the controller 30. Moreover, the electric socket may further include a radio frequency (RF) communication unit (not shown) for performing the wireless data transmission and reception using a predetermined broadband frequency signal.

The power line communication unit may be built in the electric socket or an integrated type, and can detect and receive data transmitted through the power line and transmit the data. The power line communication unit converts data about the power supplying/interruption received from a server connected through a power line network and transmits the converted data to the controller 30. Here, the controller 30 reads the data inputted from the power line communication unit and controls the switch unit 50 such that the power is supplied or interrupted to or from the connected electronic apparatus when the data is data about the power supplying.

The RF communication unit receives an RF signal and transmits an operation signal to the controller 30 such that the RF signal can be read by the controller 30. Here, the controller 30 controls the switch unit 50 according to the operating signal transmitted from the RF communication unit.

The configuration of the switch 150 will be described in detail as follows. FIG. 13 is a circuit diagram illustrating the switch and the noise removing unit of the wall electric socket according to the present invention.

As illustrated in FIG. 13, the switch 150 switches the power inputted from the power input end 10 to be inputted to the power saving circuit unit or directly to the power output end 90 according to the setting.

Here, when turning on, the switch 150 is connected to ends PS11 and PS12 to supply the power to the power saving circuit unit such that the power is supplied or automatically interrupted to or from the electronic apparatus or another electric socket according to inputs of the signal input unit 70 and the load current detector 60. Moreover, when turning off, the switch 150 is connected to ends PS21 and PS22 to supply the power directly to the power output end 90.

When the switch 150 is set to supply the power directly to the power output end 90, i.e. turned off, the power is directly supplied to the power output end 90 regardless of the operation of the power saving circuit unit.

Therefore, when the power saving circuit is abnormal, the electric socket can be switched to supply the power directly to the electronic apparatus or another electric socket so that the electric socket can be selectively used to perform a power saving function or to supply the power anytime. Moreover, the electric socket includes at least one communication unit among the RF communication unit and the power line communication unit such that the power can be automatically supplied to or interrupted from the connected electronic apparatus when the data about the power supplying is received.

FIG. 14 is a block diagram illustrating the structure of the jack connecting unit of the wall electric socket according to the present invention.

As illustrated in FIG. 14, the jack connecting unit 160 is configured such that an earjack can be connected to, and supplies a signal to the controller 30 according to a contact between signal terminals provided therein when the signal input unit 70 having the earjack or the connecting jack is inserted into the jack connecting unit 160. In other words, when the signal input unit 70 is not installed in the jack connecting unit 160, terminals 2-1 and 2 contact each other and terminals 1-1 and 1 contact each other so that a signal is transmitted to the switch unit 50 by the controller 30 and the electric socket is used as a normal power supplying electric socket. When the signal input unit 70 is installed in the jack connecting unit 160, the contact between the terminals 2-1 and 2 is released and the contact between the terminals 1-1 and 1 is also released so that the electric socket can be used as a power saving electric socket.

FIG. 15 is a block diagram illustrating a wall electric socket according to a second embodiment of the present invention.

As illustrated in FIG. 15, the wall electric socket according to the second embodiment of the present invention includes a power input end 10, a power output end 90, the setting switch 80, a signal input unit 70, a switch unit 50, a driving circuit unit 40, a load current detector 60, and a controller 30. Moreover, the electric socket further includes a noise removing unit 100, a battery 110, a memory 120, a backup memory 130, an education setting unit 140, a jack connecting unit 160, and a status lamp 170.

In the electric socket according to the present invention, similar components as the electric sockets according to the first and second embodiments and the wall electric socket according to the first embodiment are assigned by same names and same reference numeral, and their description will be omitted.

Here, the switch unit 50 is connected between the power input end 10 and the power output end 90 to supply the power to be supplied to an electronic apparatus connected to an insertion opening or other electronic apparatuses according to a control command of the controller 30 or to automatically interrupt the power from the same. At that time, the switch unit 50 is connected between the power input end 10 and the switch 150 and the power supplying unit 20 to interrupt the power to be supplied to the power supplying unit 20 when the power to be supplied to the electronic apparatus or another electric socket is interrupted.

Here, the battery 110 is recharged by the power supplied through the power input end 10 when the switch unit 50 is connected between the power input unit 10 and the power supplying unit 20, and supplies an operating voltage to the controller 30 when the power is interrupted by the switch unit 50. Moreover, the battery 110 prevents the data stored in the memory 120 from loosing.

FIG. 16 is a block diagram illustrating a wall electric socket according to a third embodiment of the present invention.

As illustrated in FIG. 16, the wall electric socket is embedded in a wall of home or a building to interrupt the standby power of an electronic apparatus connected to the wall electric socket. Moreover, the electric socket may include a signal gateway SGW in which a signal is converted and inputted from the exterior.

In this case, the electric socket includes a communication unit capable of performing data communication according to at least one communication protocol. The communication unit inputs a socket operating signal, like the signal input unit 70, and supplies a signal received from the signal gateway SGW to the electric socket MC (hereinafter, referred to as an 'main electric socket' such that the power is supplied or interrupted.

The main electric socket is connected to the signal gateway SGW via a wired line or a wireless line such that the signal gateway SGW converts an operating signal inputted from a remote controller RMC and supplies the same to the main electric socket.

FIG. 17 is a block diagram illustrating a main electric socket of the wall electric socket according to the third embodiment of the present invention and FIG. 18 is a block diagram illustrating the structure of a signal gateway of the wall electric socket according to the third embodiment of the present invention.

In this case, the main electric socket, as illustrated in FIG. 17, includes a communication unit 70 having a communication module capable of receiving data from the controller 30 according to at least communication protocol. The communication unit 70 is assigned by the same reference numeral as the above-described signal input unit because of supplying the operating signal to the controller 30.

Here, although the main electric socket MC includes a power saving circuit unit, since the same components as the above-described electric socket are assigned by same reference numerals and the descriptions will be omitted.

The signal gateway SGW, as illustrated in FIG. 18, includes an infrared receiver 320 for receiving an infrared signal transmitted from the remote controller RMC, a signal converter 330 for converting a signal, a gateway controller 310 for controlling signals inputted to and outputted from the signal converter 330 to be converted in different communication protocols, and a manual switch 350 for receiving an operating signal by a manual manipulation.

In this case, the signal gateway SGW and the main electric socket MC include same communication modules such that the signal transmission and reception is enabled therebetween. As the communication modules, the RF communication unit and the power line communication unit among the above-described plural communication modules will be described as follows.

FIG. 19 is a view illustrating the structures of the main electric socket and the signal gateway according to the RF communication of the wall electric socket according to the present invention, and FIG. 20 is a view illustrating the structures of the main electric socket and the signal gateway according to the power line communication of the wall electric socket according to the present invention.

As illustrated in FIG. 19, the main electric socket MC and the signal gateway SGW respectively include an RF communications 71 and 341. The signal gateway SGW receives a signal transmitted from the remote controller RMC through the infrared receiver 320 and the received signal is inputted to the signal converter 330 by the gateway controller 310. The signal converter 330 converts the infrared signal into an RF signal and transmits the RF signal at a predetermined broadband. In this case, the main electric socket MC receives data transmitted from the signal gateway through the RF communication unit and inputs the same to the controller 30 such that the operating signal is inputted.

As illustrated in FIG. 20, when the main electric socket MC and the signal gateway SGW include the power line communication unit, the signal gateway SGW receives the signal transmitted from the remote controller through the infrared receiver 320 and the received signal is inputted to the signal converter 330 by the gateway controller 310. The signal converter 330 converts the infrared signal into a signal according to the power line communication protocol.

At that time, the converted signal is inputted to the main electric socket through the power line PL by the power line communication unit. The main electric socket MC converts the signal received by the power line communication unit through the power line PL and inputs the converted signal to the controller 30 such that the operating signal is inputted.

FIG. 21 is a view illustrating an example of the signal gateway of the wall electric socket according to the present invention.

As described above, when signals are transmitted and received between the main electric socket MC and the signal gateway SGW using the power line communication or the RF wireless communication, the signal gateway SGW, as illustrated in FIG. 21, may be integrally formed with a lamp switch. In other words, the lamp switch 360 for turning a lamp on or off is provided and an infrared receiver 320 is provided at one of the upper, lower, left, and right sides of the lamp switch 360 such that the signal gateway SGW receives the infrared signal inputted from the remote controller.

Moreover, the manual switch 350 is provided such that the operating signal can be inputted by the manual manipulation regardless of the remote controller. In this case, at least one manual switch 350 is provided and connected to a plurality of electric sockets. In other words, a first and second manual switches 351 and 352 are connected to a first and second main electric sockets (not shown) to supply operating signal, respectively.

The signal gateway SGW integrated with the lamp switch includes a wire communication unit or a wireless communication unit 340. In this case, the communication unit 340 includes a power line communication unit 343 or an RF communication unit 341 to perform the data transmission/reception to/from the main electric socket MC. Moreover, the lamp can be turned on/off by the infrared receiver 320, the RF communication unit 341, or the power line communication unit 343.

In other words, the signal gateway SGW integrated with the lamp switch inputs the operating signal to the main electric socket MC through the RF communication unit 341 or the power line communication unit 343 when a predetermined infrared signal is inputted to the infrared receiver 320.

In this case, when the signal gateway SGW integrated with the lamp switch includes the power line communication unit 343, the power supplied to the lamp switch is connected to the power source connected to the main electric socket and the data transmission and reception is enabled by the power line communication unit 343 so that the operating signal can be inputted from the signal gateway SGW to the main electric socket MC.

FIG. 22 is a perspective view illustrating the wall electric socket according to the present invention, and FIG. 23 is an exploded perspective view illustrating the structure of the wall electric socket according to the present invention.

As illustrated in FIG. 22, the electric socket, particularly the wall electric socket includes a socket assembly having at least one insertion opening CP into which plugs of an electronic apparatus or another electric socket are inserted, and substrates 3 and 3-1 in which a power saving circuit unit for supplying or automatically interrupting the supplying power to or from the electronic apparatus connected to the insertion opening CP or another electric socket is mounted.

The socket assembly includes the insertion opening CP in which the electronic apparatus is inserted to be connected and a case. The socket assembly is configured to be separated into one or more parts.

In the electric socket, the substrates 3 and 3-1 are coupled with the rear side CP_BK of the socket assembly by one of fitting or fastening. Moreover, the socket assembly includes an insertion hole H formed at one of the upper, lower, left, and right sides of the insertion opening CP into which an earjack type connecting jack is inserted.

In this case, the insertion hole H, as illustrated in FIG. 23, is a hole into which the connecting jack/earjack of the signal input unit 70 is inserted and that is formed at the same position as that of the jack connecting unit 160 provided in the substrate installed in the rear side such that the signal input unit 70 is connected thereto.

Here, the substrates 3 and 3-1 include a first substrate 3 facing the rear side of the insertion opening CP and having a power connecting member 3-3 connected to the insertion opening CP, the jack connecting unit 160, connected to the first substrate 3, into which the connecting jack penetrating the insertion hole H is inserted and installed in, and a second substrate 3-1 having a wiring 3-3 connected to the external power source. The connecting member 3-3 is coupled with power terminals of the insertion hole H by one of fitting and fastening.

The connecting member can be connected to the first substrate 3 by being inserted into a hole CP_H for the wiring provided at the rear side CP_BK of the socket assembly CP_CASE, and the position thereof is not limited to the drawings. Moreover, when the connecting member 3-2 is installed to the socket assembly CP-CASE, the connecting member 3-2 contacts the terminals of the insertion opening CP and is connected to the plugs of the electronic apparatus when the electronic apparatus is inserted into the insertion opening CP so that the power is supplied to the connected electronic apparatus or another electric socket or the standby power can be interrupted by the power saving circuit unit.

INDUSTRIAL APPLICABILITY

According to the electric socket of the present invention, the electric socket can be connected fixed by a screw or a bolt without welding so that it is convenient to assembly and disassemble the electric socket, to easily receive A/S of a product, to improve productivity of a product, to easily perform separate collection when a product is thrown away, and to prevent circumstance pollution due to hazardous pollutants generated by the welding (or soldering).

Moreover, the electric socket of the present invention determines the status that an electronic apparatus or electronic apparatus connected to another electric socket is standby by detecting a load current so that power to be supplied is automatically interrupted after a predetermined time has elapsed. Since, although one or more electronic apparatuses having different power factor are connected to the electric socket, entire load detecting values can be varied so that the load detection and the load control are enabled even when electronic apparatuses having difference characteristics are combined. Therefore, the user convenience is remarkably improved and the power consumption consumed as the standby power is prevented so that energy and costs are significantly saved.

In a case of embedding the electric socket in a wall of a building, when a circuit is abnormal, the electric socket can be switched to supply power directly to the electronic apparatus or another electric socket. The electronic apparatus that must maintain a standby state for the communication and is connected to a network is supplied with power only at need so that undesired standby power consumption can be prevented without inconvenience of the user any restriction. The consumption of the standby power remarkably increased due to use of a home network system (about 25% of home power consumption) can be significantly reduced so that it is effective to save the energy.

While this invention has been particularly shown and described with reference to preferred embodiments thereof, it will be understood by those skilled in the art that various changes in form and details may be made therein without departing from the spirit and scope of the invention as defined by the appended claims. Therefore, this invention should not be construed as being limited to the embodiments.

What is claimed is:

1. An electric socket comprising:
   a switch unit for supplying power to be supplied to an electronic apparatus or another electric socket and interrupting the power therefrom;
   a signal input unit into which an operating signal is inputted such that the power is supplied to the electronic apparatus or another electric socket;
   a load current detector for detecting a load signal according to status of the electronic apparatus or another electric socket and inputting the load signal; and
   a controller for controlling the switch unit such to supply the power to the electronic apparatus or another electric socket when the operating signal is inputted from the signal input unit, and to automatically interrupt the power to be supplied to the electronic apparatus or another electric socket according to the load signal inputted from the load current detector,
   wherein when the input signal inputted from the signal input unit is inputted over a predetermined time, the controller is configured to control the load current detector such that a standby power consumed by the connected electronic apparatus or another electric socket is measured for a predetermined time period, and to automatically set the load detecting value for interrupting the power in response to the scale of the standby power measured by the load current detector.

2. The electric socket of claim 1, wherein the load current detector comprises:
   a current detector for detecting a load current of the power to be supplied to the electronic apparatus or another electric socket;
   an overvoltage remover for removing an overvoltage contained in an alternating current power inputted from the current detector;
   a converter for converting the alternating current power outputted from the overvoltage remover into a ripple voltage;
   a smoothing unit for smoothing the converted ripple voltage such that a direct current load signal is inputted to the controller; and
   a discharging unit for rapidly detecting a variation of the load current.

3. The electric socket of claim 2, wherein
   the overvoltage remover comprises one or more diodes, one or more capacitors, and one or more resistors,
   first and second diodes are connected to each other in reverse direction in series, and
   the capacitor is connected to the first and second diodes in parallel so as to decrease a detection error due to the determination of the load signal performed by the controller, and to remove noise or momentary overvoltage that are contained in the voltage inputted from the current detector.

4. The electric socket of claim 3, wherein the first and second diodes comprise a Zener diode such that the first and second diodes absorb and remove the momentary overvoltage generated for a short time less than a few micro seconds and the resistor and the capacitor absorb and remove the momentary overvoltage generated for every 0.1 mm second.

5. The electric socket of claim 2, wherein the converter comprises a third diode and a variable resistor for adjusting a voltage value, and
   the third diode comprises a germanium diode having an anode connected to the overvoltage remover and a cathode connected to the variable resistor.

6. The electric socket of claim 2, wherein the smoothing unit comprises at least one capacitor to smooth the ripple voltage.

7. The electric socket of claim 2, wherein the discharging unit comprises at least one resistor.

8. The electric socket of claim 1, further comprising a noise removing unit including at least one capacitor connected to an output end of the switch unit and a power output end to absorb and remove noise inputted from the connected electronic apparatus or another electric socket.

9. The electric socket of claim 1, wherein the switch unit is connected between a power input end to which the inputting power is supplied and a power output end from which the power is outputted to an electronic apparatus or another electric socket, to switch at least one of a single-pole and two-poles such that the power is supplied to the electronic apparatus or another electric socket.

10. The electric socket of claim 9, further comprising a battery for supplying a driving voltage to the controller when the power is interrupted by the switch unit.

11. The electric socket of claim 1, wherein when an education setting unit is manipulated, the controller stores a signal inputted through the signal input unit to set to detect the store operating signal and supplies the power to the electronic apparatus or another electric socket when the stored operating signal is inputted through the signal input unit.

12. The electric socket of claim 1, wherein, when the load signal inputted from the load current detector is less than the load detecting value, the controller controls the power supplied to the electronic apparatus to be automatically interrupted after a predetermined delay time has elapsed according to automatically set load detecting value.

13. The electric socket of claim 11, further comprising:
a memory for storing data for the detection of the operating signal, the automatically set load detecting value, and the delay time until the power is interrupted; and
a backup memory for storing data optionally set and stored in the memory.

14. A wall electrical socket comprising:
at least one insertion opening into which plugs of an electronic apparatus or another electric socket are inserted;
a power saving circuit for detecting a load value for the supplying or interruption of a power to supply and interrupt the power to and from the electronic apparatus connected to the insertion opening;
a jack connecting unit for supplying the power to the electronic apparatus or another electric socket directly or through the power saving circuit according to an installation status of a connecting jack when supplying the power to the electronic apparatus or another electric socket through the power saving circuit,
wherein the power saving circuit includes:
a switch unit for switching at least one of a single-pole and two-poles such that the power is supplied to the electronic apparatus or another electric socket connected to the insertion opening;
a wire or radio signal input unit to which an operating signal is inputted such that the power is supplied to the electronic apparatus or another electric socket;
a load current detector for detecting a load signal according to an operating status of the electronic apparatus or another electric socket from the power supplied to the electronic apparatus or another electric socket; and
a controller for controlling the switch unit such that the power is supplied according to an input signal from the signal input unit and the power is supplied or automatically interrupted according to the load signal from the load current detector,
wherein when the input signal inputted from the signal input unit is inputted over a predetermined time, the controller controls the load current detector such that a standby power consumed by the connected electronic apparatus or another electric socket is measured for a predetermined time period, and automatically sets the load detecting value for interrupting the power in response to the scale of the standby power measured by the load current detector.

15. The wall electrical socket of claim 14, further comprising a setting switch for setting a load detecting value for the interruption of the power to be supplied to the connected electronic apparatus or another electric socket.

16. The wall electrical socket of claim 14, further comprising at least one of a power line communication unit for receiving data contained in the inputted power, converting the data into a readable data, and supplying the converted data to the controller, and a radio frequency communication unit for receiving a radio frequency signal, converting the radio frequency signal into readable data, and supplying the converted data to the controller.

17. The wall electrical socket of claim 16, wherein the controller controls reads the data inputted from one of the radio frequency communication unit and the power line communication unit to supply or interrupt the power to or from the electronic apparatus or another electric socket.

18. The wall electrical socket of claim 14, wherein the signal input unit comprises at least one of an infrared module connected by a lead wire to receive an infrared signal and to input the operating signal to the controller, and a button for inputting an operating signal according to the supplied power when the button is pressed.

19. The wall electrical socket of claim 18, wherein the signal input unit comprises a connecting jack inserted into the jack connecting unit and is attached to or detached from the jack connecting unit.

20. The wall electrical socket of claim 19, wherein the controller detects the installation state of the jack connecting unit to supply or automatically interrupt the power to the electronic apparatus or another electric socket through the power saving circuit when the signal input unit is installed in the jack connecting unit and to supply the power directly to the electronic apparatus or another electric socket when the signal input unit is not installed.

21. The wall electrical socket of claim 14, wherein the insertion opening comprises at least one of a power saving insertion opening to which the power saving circuit unit is connected, and a normal power insertion opening, and the normal power insertion opening is different from the power saving insertion opening by at least one of color, pattern, and shape.

22. A wall electrical socket using a radio signal comprising:
a main electric socket including a power saving circuit for detecting a load value of the connected electronic apparatus or another electric socket to supply or automatically interrupt the power to or from the connected electronic apparatus or another electric socket; and
a signal gateway for converting an infrared operating signal to be received into an operating signal according to a desired communication protocol and for transmitting and inputting an operating signal the main electric socket,
wherein the power saving circuit includes:
a switch unit for switching at least one of a single-pole and two-poles such that the power is supplied to the electronic apparatus or another electric socket connected to the insertion opening;
a wire or radio signal input unit to which an operating signal is inputted such that the power is supplied to the electronic apparatus or another electric socket;
a load current detector for detecting a load signal according to an operating status of the electronic apparatus or another electric socket from the power supplied to the electronic apparatus or another electric socket; and
a controller for controlling the switch unit such that the power is supplied according to an input signal from the signal input unit and the power is supplied or automatically interrupted according to the load signal from the load current detector,
wherein when the input signal inputted from the signal input unit is inputted over a predetermined time, the controller controls the load current detector such that a standby power consumed by the connected electronic apparatus or another electric socket is measured for a predetermined time period, and automatically sets the load detecting value for interrupting the power in response to the scale of the standby power measured by the load current detector.

23. The wall electrical socket using a radio signal of claim 22, wherein the signal gateway comprises:
an infrared receiver for receiving an infrared signal;
a communication unit for transmitting and receiving data according to one of communication protocol among a radio frequency communication, a power line communication, and a local area network;

a signal converter for converting an infrared operating signal inputted from the infrared receiver into an operating signal according to at least one of the radio frequency communication, the power line communication, and the local area network;

a manual switch manually manipulated to supply the operating signal; and a gateway controller for controlling the input and output of the operating signal by at least one of the infrared receiver and the manual switch and an operation of the signal converter.

24. The wall electrical socket using a radio signal of claim 22, wherein the main electrical socket comprises a communication unit for receiving an operating signal according to at least one communication protocol of the radio frequency communication, the power line communication, and the local area network from the signal gateway, and a power saving circuit, and the power saving circuit is controlled to supply the power to the connected electronic apparatus or another electric socket according to the operating signal received through the communication unit and to supply and automatically interrupt the power by detecting a load signal according to operating statuses of the connected electronic apparatus or another electric socket.

25. The electrical socket of claim 1, further comprising a setting switch for setting a load detecting value for the interruption of the power to be supplied to the connected electronic apparatus or another electric socket.

26. The electrical socket of claim 1, wherein the signal input unit includes at least one of an infrared module connected by a lead wire to receive an infrared signal and to input the operating signal to the controller, and a button for inputting an operating signal according to the supplied power when the button is pressed.

27. The wall electrical socket of claim 14, wherein the power saving unit further comprises a switch for switching the power to be directly supplied to the electronic apparatus or another electric socket when the power saving circuit is malfunctioned.

28. The wall electric socket of claim 14, wherein when an education setting unit is manipulated, the controller is configured to store a signal inputted through the signal input unit to set to detect the store operating signal and to supply the power to the electronic apparatus or another electric socket when the stored operating signal is inputted through the signal input unit.

* * * * *